(12) United States Patent
Zhang et al.

(10) Patent No.: US 12,330,976 B2
(45) Date of Patent: Jun. 17, 2025

(54) COMPLETE SETS OF EQUIPMENT FOR SUPPLYING DRINKING WATER IN FIELD

(71) Applicants: CHANGZHOU UNIVERSITY, Jiangsu (CN); JIANGSU MAYMUSE ENVIRONMENTAL TECHNOLOGY CO.LTD, Jiangsu (CN)

(72) Inventors: Yihan Zhang, Changzhou (CN); Yi Zhang, Changzhou (CN); Min Shen, Changzhou (CN); Jianfeng Jiang, Changzhou (CN); Shi Bu, Changzhou (CN)

(73) Assignees: CHANGZHOU UNIVERSITY, Changzhou (CN); JIANGSU MAYMUSE ENVIRONMENTAL TECHNOLOGY CO.LTD, Changzhou (CN)

( * ) Notice: Subject to any disclaimer, the term of this patent is extended or adjusted under 35 U.S.C. 154(b) by 527 days.

(21) Appl. No.: 17/817,336

(22) Filed: Aug. 3, 2022

(65) Prior Publication Data

US 2023/0132109 A1   Apr. 27, 2023

Related U.S. Application Data

(63) Continuation of application No. PCT/CN2022/100967, filed on Jun. 24, 2022.

(30) Foreign Application Priority Data

Oct. 27, 2021   (CN) .......................... 202111253217.X

(51) Int. Cl.
  *C02F 9/20*   (2023.01)
  *B01D 61/02*   (2006.01)
  (Continued)

(52) U.S. Cl.
  CPC .............. *C02F 9/20* (2023.01); *B01D 61/025* (2013.01); *B01D 61/12* (2013.01); *B01D 65/02* (2013.01);
  (Continued)

(58) Field of Classification Search
  CPC .. C02F 9/20; C02F 1/008; C02F 1/001; C02F 1/32; C02F 1/441; C02F 2201/005;
  (Continued)

(56) References Cited

U.S. PATENT DOCUMENTS 5,399,260 A * 3/1995 Eldredge ................... C02F 1/76
                                                       210/411
8,282,823 B2 * 10/2012 Acernese ............... B01D 61/10
                                                       210/259
(Continued)

FOREIGN PATENT DOCUMENTS

CN   207286832 U   5/2018
CN   111348724 A   6/2020
(Continued)

OTHER PUBLICATIONS

International Search Report in PCT/CN2022/100967 mailed on Sep. 21, 2022, 10 pages.
(Continued)

*Primary Examiner* — Terry K Cecil
(74) *Attorney, Agent, or Firm* — METIS IP LLC

(57) ABSTRACT

The present disclosure provides a complete set of equipment for supplying drinking water in field. The complete set of equipment for supplying drinking water in field consists of several units carried by single person, making the water purification equipment easy to use and transport. The complete set of equipment includes a multi-stage filtration unit, a reverse osmosis unit, and a power control unit connected by a plug-in pipeline.

15 Claims, 19 Drawing Sheets

(51) Int. Cl.
  *B01D 61/12* (2006.01)
  *B01D 65/02* (2006.01)
  *B01D 71/02* (2006.01)
  *C02F 1/00* (2023.01)
  *C02F 1/32* (2023.01)
  *C02F 1/44* (2023.01)

(52) U.S. Cl.
  CPC .............. *B01D 71/02* (2013.01); *C02F 1/008* (2013.01); *B01D 2311/14* (2013.01); *B01D 2311/20* (2013.01); *B01D 2311/24* (2013.01); *B01D 2311/2649* (2013.01); *B01D 2311/2692* (2013.01); *B01D 2313/243* (2013.01); *B01D 2315/10* (2013.01); *C02F 1/001* (2013.01); *C02F 1/32* (2013.01); *C02F 1/441* (2013.01); *C02F 2201/005* (2013.01); *C02F 2201/009* (2013.01); *C02F 2209/03* (2013.01); *C02F 2301/08* (2013.01); *C02F 2303/04* (2013.01); *C02F 2303/16* (2013.01)

(58) Field of Classification Search
  CPC ............ C02F 2201/009; C02F 2209/03; C02F 2301/08; C02F 2303/04; C02F 2303/16; C02F 9/00; C02F 1/283; C02F 1/444; B01D 61/025; B01D 61/12; B01D 65/02; B01D 71/02; B01D 2311/14; B01D 2311/20; B01D 2311/24; B01D 2311/2649; B01D 2311/2692; B01D 2313/243; B01D 2315/10; B01D 61/145; B01D 2311/2619; B01D 61/081; B01D 61/58; B01D 2311/04
  See application file for complete search history.

(56) References Cited

U.S. PATENT DOCUMENTS

| | | | |
|---|---|---|---|
| 2015/0136666 | A1 | 5/2015 | Tais Zamir et al. |
| 2016/0289110 | A1* | 10/2016 | Oh .......................... C02F 1/008 |

FOREIGN PATENT DOCUMENTS

| | | |
|---|---|---|
| CN | 210855627 U | 6/2020 |
| CN | 212375062 U | 1/2021 |
| CN | 112624365 A | 4/2021 |
| CN | 113248064 A | 8/2021 |
| CN | 113896365 A | 1/2022 |
| CN | 216549859 U | 5/2022 |
| CN | 216549860 U | 5/2022 |
| CN | 216549974 U | 5/2022 |
| CN | 216549975 U | 5/2022 |

OTHER PUBLICATIONS

Written Opinion in PCT/CN2022/100967 mailed on Sep. 21, 2022, 12 pages.

* cited by examiner

COMPLETE SETS OF EQUIPMENT FOR SUPPLYING DRINKING WATER IN FIELD

CROSS-REFERENCE TO RELATED APPLICATION

This application is a continuation of International Patent Application No. PCT/CN2022/100967, filed on Jun. 24, 2022, which claims priority of Chinese Patent Application No. 202111253217.X, filed on Oct. 27, 2021, the contents of which are entirely incorporated herein by reference.

TECHNICAL FIELD

The present disclosure relates to the technical field of water purification equipment, and more particularly to a complete set of equipment for supplying drinking water in field.

BACKGROUND

The existing mobile water treatment equipment is mainly vehicle-mounted to meet the water demand in some unexpected occasions, such as the place where disasters occurs. For mountainous areas that cannot be reached by vehicles, they will be lifted by helicopters. These water purification equipment needs to deal with various water quality that may be encountered, so the design process is complex and many functional components are needed, so that the mass and volume of the equipment is large and the transportation is extremely inconvenient. In addition, the curing process and the curing connection relationship of each component make the disassembly and replaceability of the equipment parts not high, which brings inconvenience to the operation and maintenance. Therefore, the existing mobile water purification equipment is difficult to transport and inconvenient to use.

SUMMARY

The technical problem to be solved by the present disclosure is: to provide a complete set of equipment for supplying drinking water in field, which consists of several units, and each unit may be carried by one person, so as to realize the purpose of convenient use and convenient transportation of water purification equipment.

The technical solution adopted by the present disclosure to solve the technical problem are as follows.

A complete set of equipment for supplying drinking water in field includes a multi-stage filtration unit, a reverse osmosis unit, and a power control unit connected by a plug-in pipeline. The multi-stage filtration unit, the reverse osmosis unit, and the power control unit may be units respectively carried by a single person and have frames with rectangular outer contours.

The multi-stage filtration unit may include a first raw water inlet, a first pre-filter, a pressure pump, a ceramic membrane separator, a multi-media filter, an ultraviolet sterilizer, and a first purified water outlet connected by a pipe. The first pre-filter, the pressure pump, the ceramic membrane separator, the multi-media filter, and the ultraviolet sterilizer may be fixed in the frame. The multi-stage filtration unit may further include a first relief switch, a second relief switch, and a third relief switch. A water inlet of the first relief switch may be connected with a water outlet cavity of the first pre-filter, a water inlet of the second relief switch may be connected with a water outlet cavity of the ceramic membrane separator, a water inlet of the third relief switch may be connected with a water outlet cavity of the multi-media filter, and water outlets of the first relief switch, the second relief switch, and the third relief switch may be connected with a first relief port of the multi-stage filtration unit. The multi-stage filtration unit may further include a reclaimed water outlet and a water purification mode switching valve. The water purification mode switching valve may have two states of connecting the water outlet cavity of the ceramic membrane separator with the reclaimed water outlet and connecting the water outlet cavity of the multi-media filter and the water inlet cavity of the ultraviolet sterilizer.

The reverse osmosis unit may include a second raw water inlet, a second pre-filter, a high-pressure pump, a reverse osmosis membrane filter, and a second purified water outlet connected by the pipe. The second pre-filter, the high-pressure pump, and the reverse osmosis membrane filter may be fixed in the frame. The reverse osmosis unit may have a first relief valve, a second relief valve, and a shut-off regulating valve, a water inlet of the first relief valve may be connected with a water outlet cavity pipe of the second pre-filter, a water inlet of the second relief valve may be connected with a water outlet pipe of the reverse osmosis membrane filter, a water inlet of the shut-off regulating valve may be connected with a water inlet cavity pipeline of the reverse osmosis membrane filter, and the first relief valve, water outlets of the second relief valve and the shut-off regulating valve are connected with a second relief port of the reverse osmosis unit.

In some embodiments, the frame of the power control unit may have panels on six sides, and the panels may be provided with 220V Alternating Current (AC), 24V Direct Current (DC), and 12V DC power inlet, the panels may also be provided with a power outlet for supplying 24V DC to the reverse osmosis unit and the multi-stage filtration unit of water treatment respectively and an auxiliary power outlet for supplying 24V DC to heating jackets of the reverse osmosis unit and the multi-stage filtration unit respectively, the panels may also be provided with separate power output buttons for connecting power buttons, working power of the reverse osmosis unit and the multi-stage filtration unit, and power of the heating jacket; and a power adapter in the frame may include a switching power supply for converting 220V AC to 24V DC and a power converter for converting 12V DC to 24V DC, and the switching power supply may include a leakage circuit breaker, and the power converter may include a DC circuit breaker.

In order to meet the requirement that the water pressure of the high-pressure pump can be adjusted, and improve the efficiency of the reverse osmosis unit, the frame of the power control unit may further be provided with a high-pressure pump driver for adjusting rotational speed of the high-pressure pump of the reverse osmosis unit, the high-pressure pump driver may be located between the 24V DC power supply and a power supply interface of the reverse osmosis unit, and the panel may be provided with a signal interface for receiving an adjustment signal of the reverse osmosis unit.

In order to facilitate a single person to carry each unit, the frames of the multi-stage filtration unit, the reverse osmosis unit, and the power control unit may be respectively provided with buckle ears for carrying each unit.

In some embodiments, the ceramic membrane separator of the multi-stage filtration unit may be a cross-flow membrane separator, and a water outlet of a cross-flow valve connected with the water inlet cavity of the ceramic membrane separator may be connected with the first relief port.

In order to allow the water stored in each filter to be quickly drained after the unit is stopped, the multi-stage filtration unit may have a first air supply switch and a second air supply switch, and the first air supply switch may be connected with a water inlet cavity pipe of the ceramic membrane separator, and the second air supply switch may be connected with a water outlet cavity pipe of the ceramic membrane separator.

In order to be able to continue water treatment manually in the event of a power failure, the pressure pump of the multi-stage filtration unit may include an electric booster pump and a manual booster pump which are connected in parallel on the pipe, and two parallel nodes may be respectively provided with a three-way directional valve.

In some embodiments, the complete set of equipment may further include a water storage unit. The water storage unit may be a box that doubles as the multi-stage filtration unit, the reverse osmosis unit, and the power control unit for storing and transporting packaging boxes.

In some embodiments, the water storage unit may include a water volume sensing device, and the water volume sensing device may be configured to: detect a water volume of purified water in the water storage unit; and issue a water shortage reminder when the water volume is lower than a water volume threshold.

In order to determine the appropriate pressure information to be applied in various treatment links to ensure the stable operation of the complete set of equipment for supplying drinking water in field, the complete set of equipment for supplying drinking water in field may further include a water quality detection unit and a processing unit. The water quality detection unit may be configured to: determine a water quality detection data of raw water through detecting the raw water, the processing unit may be configured to: determine a first pressure information of the pressure pump in the multi-stage filtration unit and a second pressure information of the high-pressure pump in the reverse osmosis unit based on the water quality detection data, obtain purified product water through controlling the multi-stage filtration unit to purify the raw water based on the first pressure information, and obtain the purified water through controlling the reverse osmosis unit to purify the purified product water based on the second pressure information.

In some embodiments, the processing unit may further be configured to: obtain a target water outlet speed of the purified water, obtain a first lifespan of the multi-stage filtration unit at current and a second lifespan of the reverse osmosis unit at current, and determine the first pressure information and the second pressure information based on a pressure determination model processing the water quality detection data, the target water outlet speed, the first lifespan, and the second lifespan.

In order to ensure the quality of the purified water obtained, the complete set of equipment for supplying drinking water in field may further include a backwashing unit. The processing unit may further be configured to: obtain a historical target water purification speed of last water purification treatment of the complete set of the equipment, a historical purification water production speed of an actual production purified product water, and a historical water purification speed of an actual production water purification, determine whether backwashing needs to be performed on at least one of the multi-stage filtration unit or the reverse osmosis unit based on the historical target water purification speed, the historical purification water production speed, and the historical water purification speed, in response to a determination that the backwashing needs to be performed on at least one of the multi-stage filtration unit or the reverse osmosis unit, determine backwashing parameters for backwashing at least one of the multi-stage filtration unit or the reverse osmosis unit based on the historical target water purification speed, the historical purification water production speed, and the historical water purification speed; send the backwashing parameters to the backwashing unit. The backwashing unit may be configured to: backwashing at least one of the multi-stage filtration unit or the reverse osmosis unit based on the backwashing parameters.

In some embodiments, the processing unit may further be configured to: obtain the target water outlet speed of the purified water, obtain the first lifespan of the multi-stage filtration unit at current and the second lifespan of the reverse osmosis unit at current, and determine the backwashing parameters based on a backwashing model processing the historical target water purification speed, the historical purification water production speed, the historical water purification speed, the historical water purification speed, the first lifespan, and the second lifespan.

A method for supplying drinking water in field comprises following operations. Water quality detection data of raw water may be obtained; a first pressure information of a pressure pump of a multi-stage filtration unit and the second pressure information of a high-pressure pump of a reverse osmosis unit may be determined based on the water quality detection data; purified product water may be obtained through controlling the multi-stage filtration unit to purify the raw water based on the first pressure information; and the purified water may be obtained through controlling the reverse osmosis unit to purify the purified product water based on the second pressure information.

In some embodiments, a first pressure information of a pressure pump of a multi-stage filtration unit and the second pressure information of a high-pressure pump of a reverse osmosis unit may be determined based on the water quality detection data including follow operations. A target water outlet speed of the purified water may be obtained, a first lifespan of the multi-stage filtration unit at current and a second lifespan of the reverse osmosis unit at current may be obtained; and the first pressure information and the second pressure information may be determined based on a pressure determination model processing the water quality detection data, the target water outlet speed, the first lifespan, and the second lifespan.

The method further comprises following operations. A historical target water purification speed of last water purification treatment of the complete set of the equipment, a historical purification water production speed of an actual production purified product water, and a historical water purification speed of an actual production water purification may be obtained; whether backwashing needs to be performed on at least one of the multi-stage filtration unit or the reverse osmosis unit may be determined based on the historical target water purification speed, the historical purification water production speed, and the historical water purification speed; in response to a determination that the backwashing needs to be performed on at least one of the multi-stage filtration unit or the reverse osmosis unit, backwashing parameters for backwashing at least one of the multi-stage filtration unit or the reverse osmosis unit may be determined based on the historical target water purification speed, the historical purification water production speed, and the historical water purification speed; the backwashing parameters may be sent to the backwashing unit; and the backwashing unit may be controlled to backwash at least one of the multi-stage filtration unit or the reverse osmosis unit based on the backwashing parameters.

In some embodiments, the backwashing parameters for backwashing at least one of the multi-stage filtration unit or the reverse osmosis unit may be determined based on the historical target water purification speed, the historical purification water production speed, and the historical water purification speed including following operations. The target water outlet speed of the purified water may be obtained; the first lifespan of the multi-stage filtration unit at current and the second lifespan of the reverse osmosis unit at current may be obtained; and the backwashing parameters may be determined based on a backwashing model processing the historical target water purification speed, the historical purification water production speed, the historical water purification speed, the historical water purification speed, the first lifespan, and the second lifespan.

A system for supplying drinking water in field comprises: a first obtaining module configured to obtain water quality detection data of raw water, a first determination module configured to determine a first pressure information of a pressure pump of a multi-stage filtration unit and the second pressure information of a high-pressure pump of a reverse osmosis unit based on the water quality detection data, a first control module configured to determine a first pressure information of a pressure pump of a multi-stage filtration unit and the second pressure information of a high-pressure pump of a reverse osmosis unit based on the water quality detection data; and a second control module configured to obtain the purified water through controlling the reverse osmosis unit to purify the purified water based on the second pressure information.

The system further comprises: a second obtaining module configured to obtain a historical target water purification speed of last water purification treatment of the complete set of the equipment, a historical purification water production speed of an actual production purified product water, and a historical water purification speed of an actual production water purification, a second determination module configured to determine whether backwashing needs to be performed on at least one of the multi-stage filtration unit or the reverse osmosis unit based on the historical target water purification speed, the historical purification water production speed, and the historical water purification speed, in response to a determination that the backwashing needs to be performed on at least one of the multi-stage filtration unit or the reverse osmosis unit, a third determination module configured to determine backwashing parameters for backwashing at least one of the multi-stage filtration unit or the reverse osmosis unit based on the historical target water purification speed, the historical purification water production speed, and the historical water purification speed, a sending module configured to send the backwashing parameters to the backwashing unit, and a fourth control module configured to control the backwashing unit to backwash at least one of the multi-stage filtration unit or the reverse osmosis unit based on the backwashing parameters.

A non-transitory computer-readable storage medium for storing computer instructions, when reading the computer instructions in the storage medium, a computer implements to realize the above-mentioned method for supplying drinking water in field.

The beneficial effects of the present disclosure are as follows: the present disclosure designs the water treatment equipment into a plurality of units that can be carried by a single person, which can meet the treatment requirements for various raw water quality in the field by using alone or in combination and treat raw water into domestic, drinking water, or even higher levels of water. The multi-stage filtration unit and reverse osmosis unit are designed to be able to quickly drain the internal residual water when not in use, which can quickly transfer and reduce the weight of the equipment during transferring and preventing the filtration from freezing at low temperature when not in use.

BRIEF DESCRIPTION OF THE DRAWINGS

The present disclosure may be further explained by way of exemplary embodiments, which may be described in detail by means of the accompanying drawings. These examples are not limiting, in these examples, the same numbers refer to the same structures, wherein.

Figure 1:
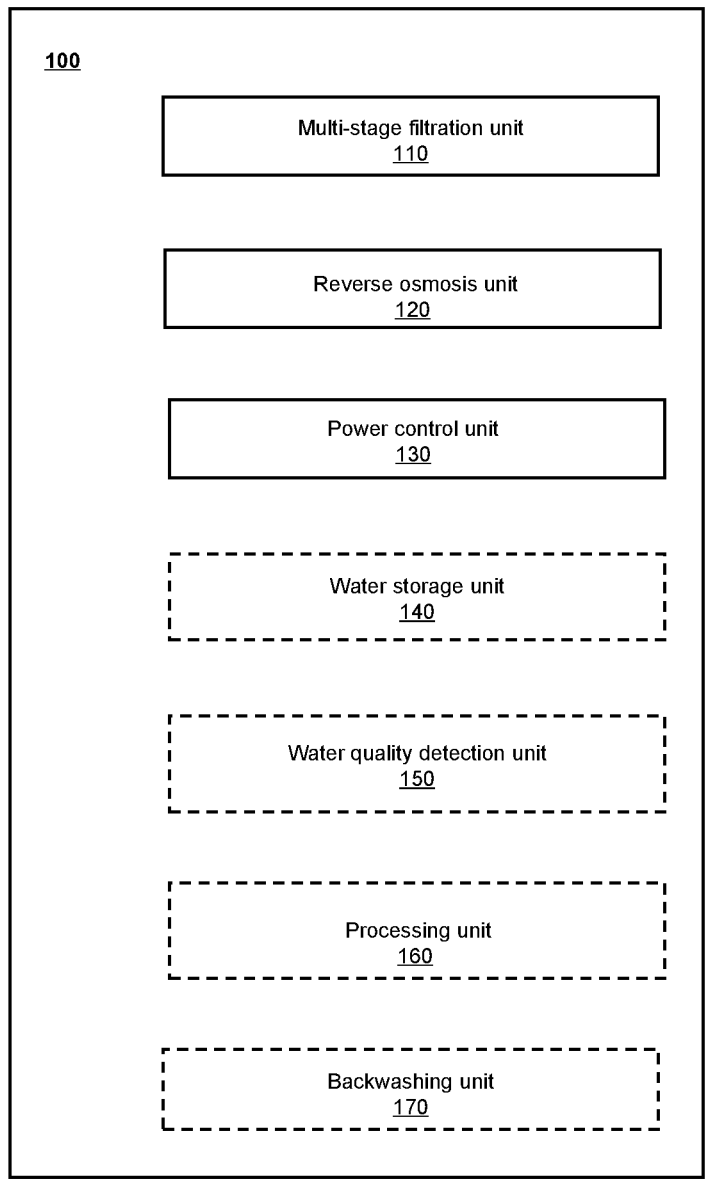
FIG. 1 illustrates an exemplary block diagram of a complete set of equipment for supplying drinking water in field according to some embodiments of the present disclosure.

In the drawings: 1, first raw water inlet; 2, first pre-filter; 3-1, electric booster pump; 3-2; manual booster pump; 4, ceramic membrane separator; 5, multi-media filter; 6, ultraviolet sterilizer; 7, first water purified outlet; 8, first relief port; 10, water purification mode switching valve; 11; second raw water inlet; 12, second pre-filter; 13, high-pressure pump; 14, reverse osmosis membrane filter; 15, second purified water outlet; 16, first relief valve; 17, second relief valve; 18, shut-off regulating valve; 19, second relief port; 20, power inlet; 21, power output; 22, auxiliary power outlet; 23, switching power supply; 24, power converter; 25, leakage circuit breaker; 26, DC circuit breaker; 27, high-pressure pump driver; 28, signal interface; 29, buckle ear; 30, cross-flow valve; 31, first air supply switch; 32, second air supply switch; 33, third relief valve; 34, relay; 35, fan; 36, charging port.

DETAILED DESCRIPTION

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", and/or "the" do not only specifically refer to the singular, but also include the plural. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to describe operations performed by a system according to an embodiment of the present disclosure. It should be understood that the preceding or following operations are not necessarily performed in the exact order. Instead, the various operations may be processed in reverse order or simultaneously. Also, other operations may be added to these procedures, or an operation or operations may be removed from these procedures.

FIG. 1 illustrates an exemplary block diagram of a complete set of equipment for supplying drinking water in field according to some embodiments of the present disclosure.

As shown in FIG. 1, a complete set of equipment 100 for supplying drinking water in field may include a multi-stage filtration unit 110, a reverse osmosis unit 120, and a power control unit 130.

The multi-stage filtration unit 110 may be a component for filtering raw water to remove insoluble matter and sterilizing. The multi-stage filtration unit may be connected with the reverse osmosis unit through a pipe, so that the purified product water obtained through filtering by the multi-stage filtration unit may be input into the reverse osmosis unit for further treatment. For the specific descriptions of the multi-stage filtration unit, please refer to FIG. 5, FIG. 6, and their related descriptions.

The reverse osmosis unit 120 may be a component for performing reverse osmosis on raw water to remove solutes. The reverse osmosis unit may be connected with the multi-stage filtration unit and the power control unit, so as to provide the reverse osmosis unit with the purified product water and the power required for the reverse osmosis process. For the specific description of the reverse osmosis unit, please refer to FIG. 7, FIG. 8 and their related descriptions.

The power control unit 130 may be a component that provides electrical and thermal energy to each unit in the complete set of equipment 100 for supplying drinking water in field. The power control unit may be electrically connected with the multi-stage filtration unit and the reverse osmosis unit to provide power for the water purification process. For the specific descriptions of the power control unit, please refer to FIGS. 9-11 and their related descriptions.

In some embodiments, the complete set of equipment 100 for supplying drinking water in field may also include a water storage unit 140. The water storage unit 140 may be a component for storing purified water and storing other units. The water storage unit may be connected with the multi-stage filtration unit and the reverse osmosis unit through the pipe to realize the storage of purified product water and purified water. For the specific descriptions of the water storage unit, please refer to FIG. 13 and its related descriptions.

In some embodiments, the complete set of equipment 100 for supplying drinking water in field may further include a water quality detection unit 150. The water quality detection unit 150 may be a component for detecting raw water to obtain water quality detection data. For the specific descriptions of the water quality detection unit, please refer to FIG. 14 and its related descriptions.

In some embodiments, the complete set of equipment 100 for supplying drinking water in field may also include a processing unit 160. The processing unit 160 may be connected with each component in the complete set of equipment 100 for supplying drinking water in field to receive data acquired by each unit, process the aforementioned data, or control each unit. In some embodiments, the processing unit 160 may obtain water quality detection data to determine the first pressure information of the pressure pump in the multi-stage filtration unit and the second pressure information of the high-pressure pump in the reverse osmosis unit. In some embodiments, the processing unit 160 may obtain purified product water through controlling the multi-stage filtration unit to purify the raw water based on the first pressure information. In some embodiments, the processing unit 160 may obtain purified water through controlling the reverse osmosis unit to purify the purified water based on the second pressure information. For the specific descriptions of the processing unit, please refer to FIGS. 14-19 and their related descriptions.

In some embodiments, the complete set of equipment 100 for supplying drinking water in field may further include a backwashing unit 170. The backwashing unit 170 may be connected with the multi-stage filtration unit 110 and/or the reverse osmosis unit 120 to remove impurities in the multi-stage filtration unit 110 and/or the reverse osmosis unit 120. For the specific descriptions of the backwashing unit, please refer to FIG. 16, FIG. 17, and their related descriptions.

It should be noted that the above-mentioned water storage unit 140, water quality detection unit 150, processing unit 160, and backwashing unit 170 may be unnecessary. In some cases, the complete set of equipment 100 for supplying drinking water in field may include only the multi-stage filtration unit 110, the reverse osmosis unit 120, and the power control unit 130, or one or more of the foregoing units. In some cases, the complete set of equipment 100 for supplying drinking water in field may further include other units. For example, the complete set of equipment 100 for supplying drinking water in field may also include a storage unit (not shown in the figures). The storage unit may be used to store relevant data of the complete set of equipment 100 for supplying drinking water in field, including but not limited to water purification speed, purification water production speed, target water purification speed, etc., during each water purification treatment. For another example, the complete set of equipment 100 for supplying drinking water in field may further include a water delivery unit (not shown in the figures) for extracting raw water from outside.

It should be noted that the above descriptions of the complete set of equipment 100 for supplying drinking water in field and its components is only for the convenience of description, which does not limit the descriptions to the scope of the illustrated embodiments. It may be understood that for those skilled in the art, after understanding the principle of the system, it is possible to arbitrarily combine various components, or form sub-equipment to connect with other components without departing from the principle. For example, the functions of a multi-stage filtration unit and a reverse osmosis unit may be implemented in one unit. Such deformations are within the scope of protection of the present disclosure.

Figure 2:
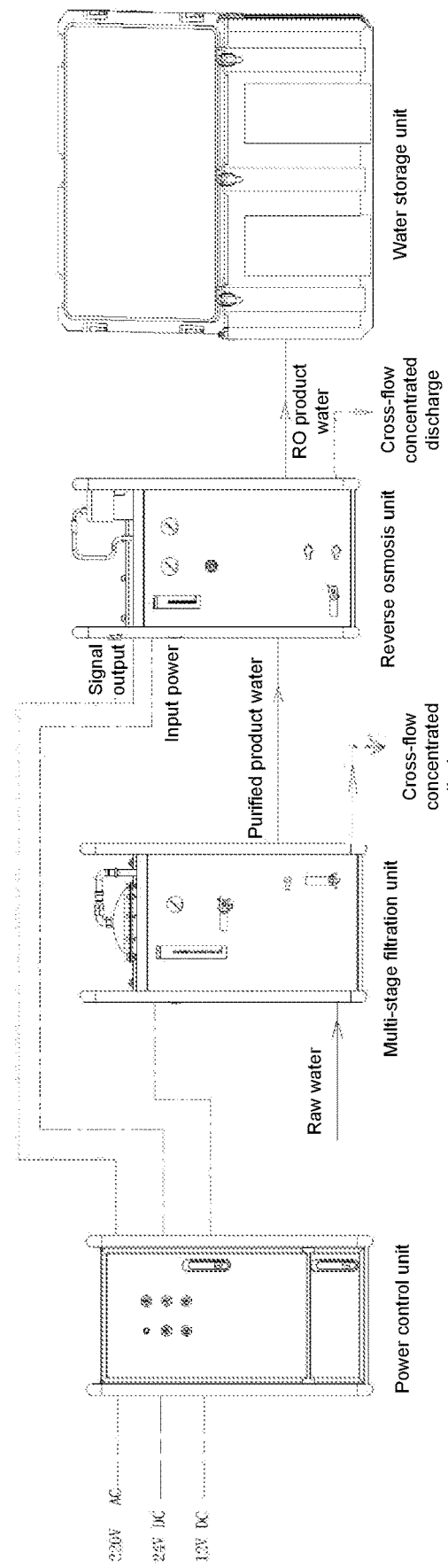
FIG. 2 illustrates an exemplary relationship diagram when each unit of the complete set of equipment is used in combination according to some embodiments of the present disclosure.
Figure 13:
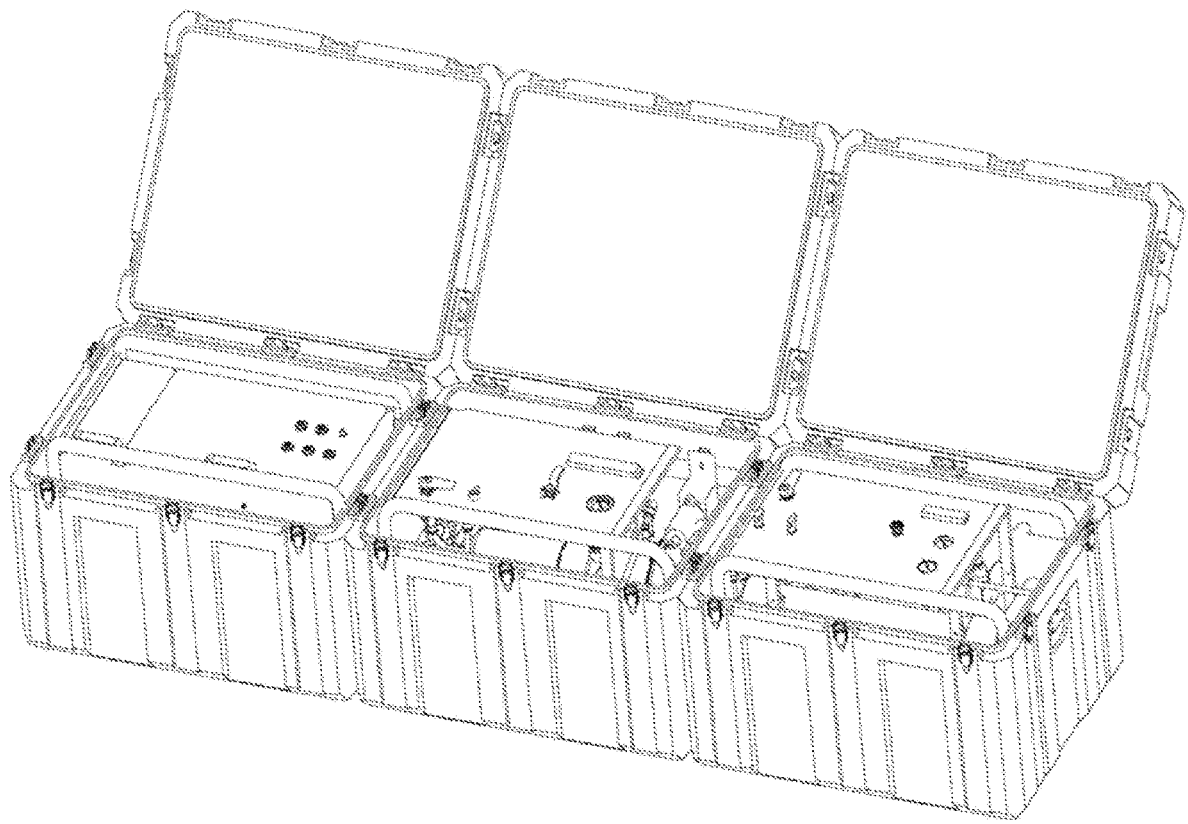
FIG. 13 illustrates a schematic diagram of using a water storage unit to accommodate other units according to some embodiments of the present disclosure.

FIG. 2 illustrates an exemplary relationship diagram when each unit of the complete set of equipment is used in combination according to some embodiments of the present disclosure. The complete set of equipment includes a multi-stage filtration unit, a reverse osmosis unit, and a power control unit connected by a plug-in pipeline. The plug-in pipeline may be a wire with plugs at both ends and a water pipeline with quick connectors at both ends. The multi-stage filtration unit, the reverse osmosis unit, and the power control unit are units respectively carried by a single person and have frames with rectangular outer contours. The outer contour is rectangular, which means that the main part of the six outer contour surfaces of the frame is flat rather than curved, and each surface is a rectangular or trapezoidal quadrilateral. Referring to FIG. 13, the water storage unit of the complete set of equipment may be three boxes that double as multi-stage filtration unit, reverse osmosis unit, and power control unit for storage and transportation. The three boxes may be integrated or separated. When the water storage unit is used, it may be cleaned and disinfected before storing purified water.

Figure 3:
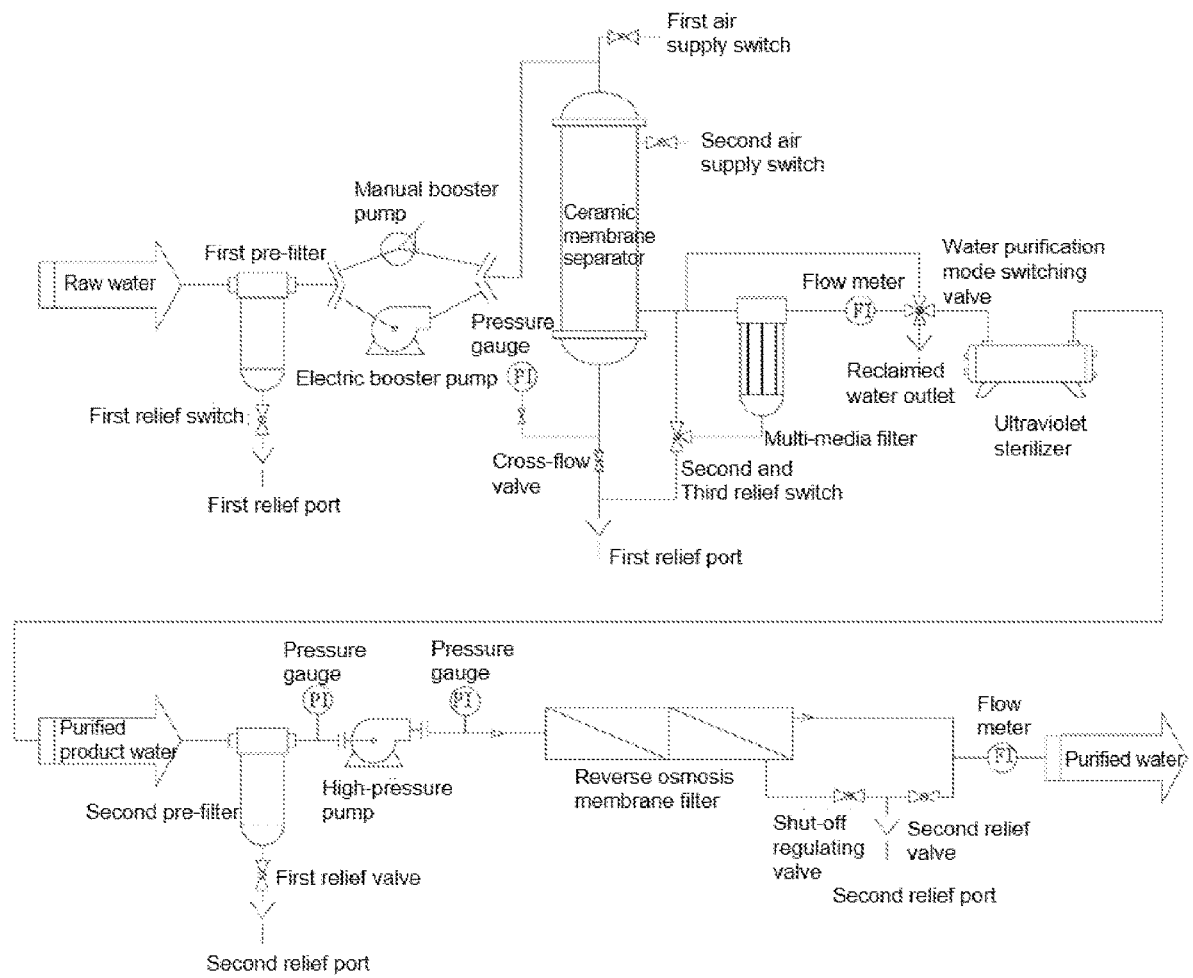
FIG. 3 illustrates a schematic diagram of water treatment according to some embodiments of the present disclosure.
Figure 5:
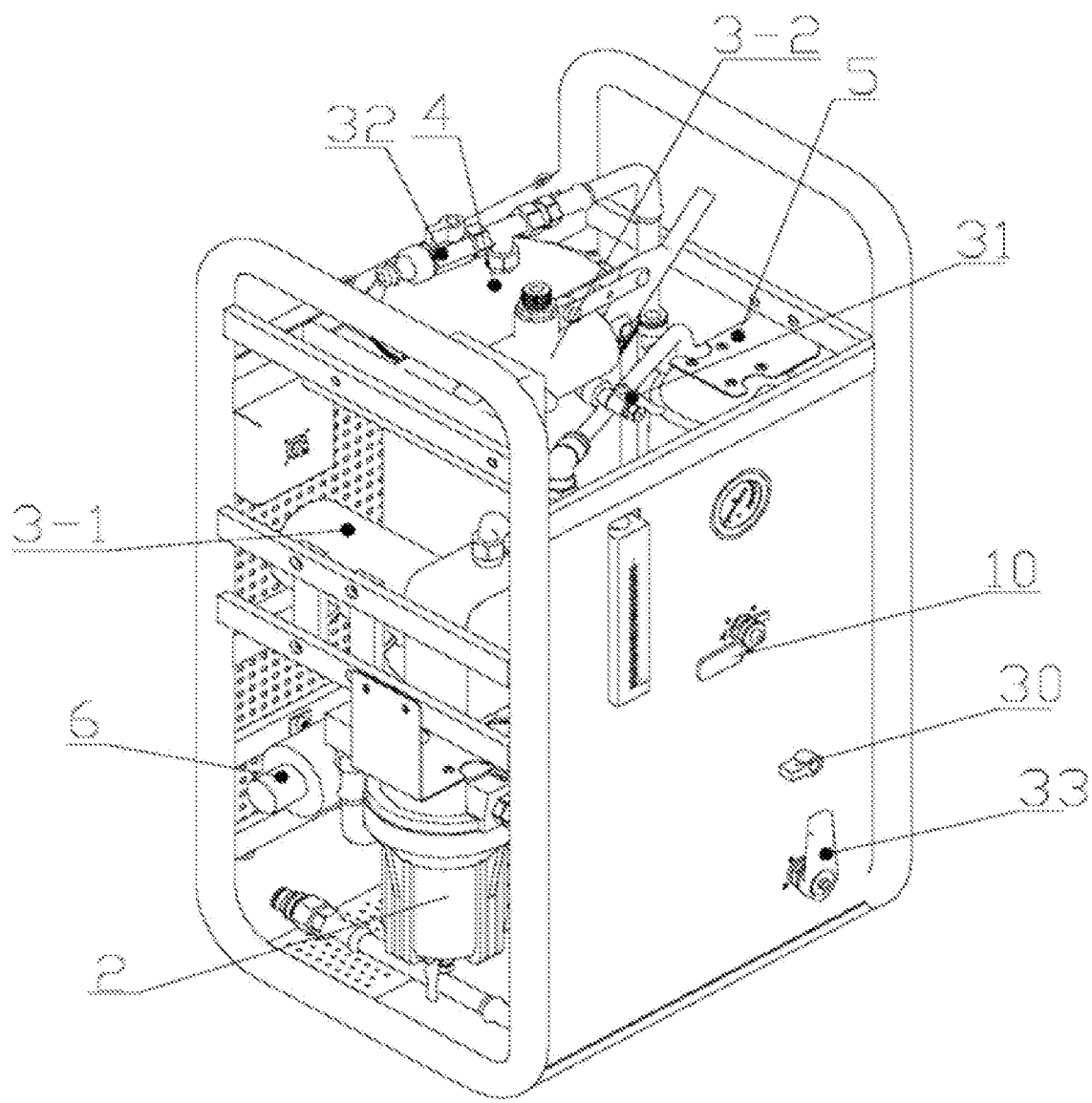
FIG. 5 illustrates a perspective view of a multi-stage filtration unit according to some embodiments of the present disclosure.
Figure 6:
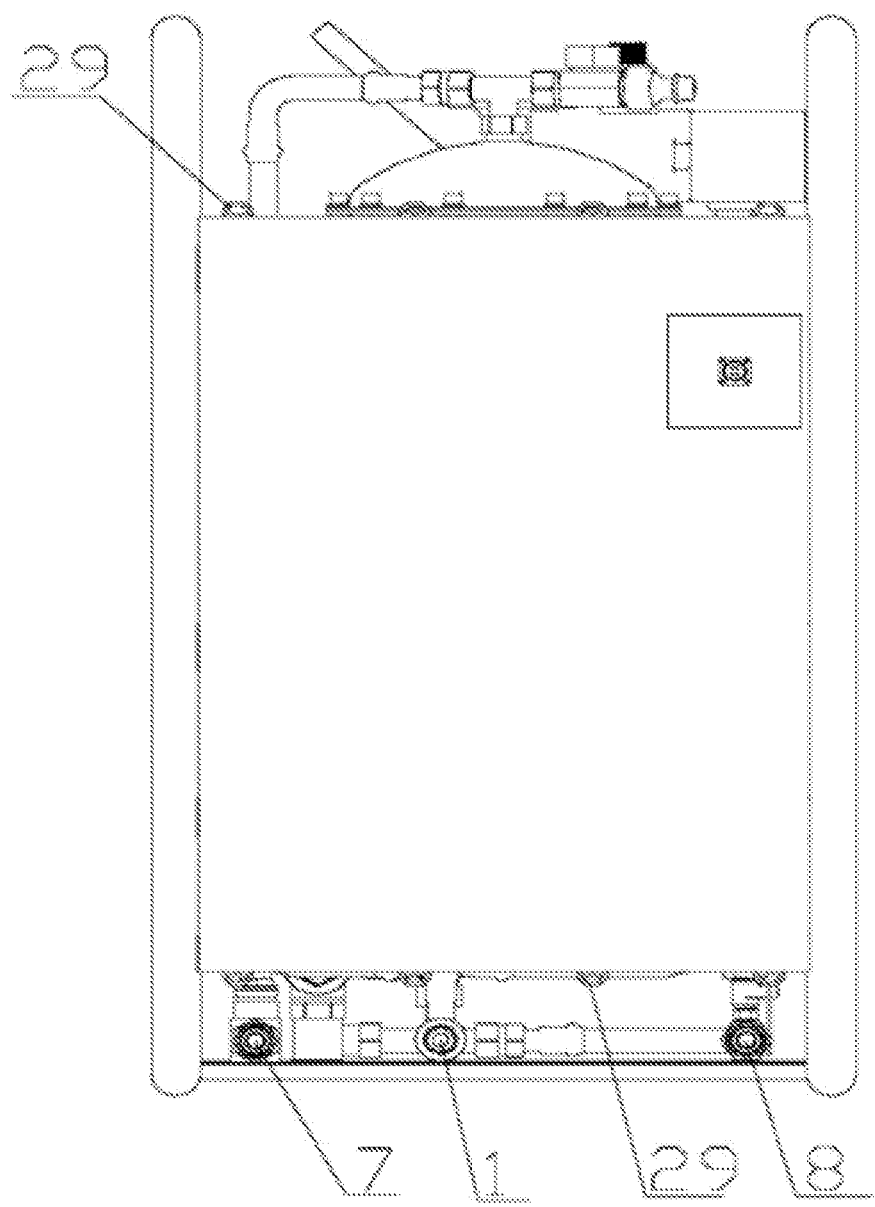
FIG. 6 illustrates a rear elevational view of a multi-stage filtration unit according to some embodiments of the present disclosure.

FIG. 5 and FIG. 6 are schematic structural diagrams of the multi-stage filtration unit according to some embodiments of the present disclosure. The water treatment process of the unit is shown in FIG. 3, including a first raw water inlet 1, a first pre-filter 2, a pressure pump 3, a ceramic membrane separator 4, a multi-media filter 5, an ultraviolet sterilizer 6, and a first purified water outlet 7 connected by a pipe, where the first pre-filter 2, the pressure pump, the ceramic membrane separator 4, the multi-media filter 5, and the ultraviolet sterilizer 6 are fixed in the frame. The multi-stage filtration unit may further include a first relief switch, a second relief switch, and a third relief switch. A water inlet of the first relief switch is connected with a water outlet cavity of the first pre-filter 2. A water inlet of the second relief switch is connected with a water outlet cavity of the ceramic membrane separator 4. A water inlet of the third relief switch is connected with a water outlet cavity of the multi-media filter 5. Water outlets of the first relief switch, the second relief switch, and the third relief switch are connected with a first relief port 8 of the multi-stage filtration unit. The first relief switch, the second relief switch, and the third relief switch may be integrated on the third relief valve 33. The multi-stage filtration unit further includes a reclaimed water outlet and a water purification mode switching valve 10. The water purification mode switching valve 10 has two states of connecting the water outlet cavity of the ceramic membrane separator 4 with the reclaimed water outlet and connecting the water outlet cavity of the multi-media filter 5 and the water inlet cavity of the ultraviolet sterilizer 6. The first pre-filter 2 may be a laminated filter, a metal mesh filter, and/or a Y-type filter. The multi-media filter 5 may be activated carbon and/or resin particles.

The ceramic membrane separator 4 in the multi-stage filtration unit may be a cross-flow membrane separator. A water outlet of the cross-flow valve 30 connected with the water inlet cavity of the ceramic membrane separator 4 may be connected with the first relief port 8. The cross-flow valve 30 is located below the ceramic membrane separator 4, and the cross-flow valve 30 may be adjusted to change the amount of water directly discharged from the water inlet chamber, thereby changing the amount of water produced through the ceramic membrane. Since the cross-flow valve 30 is located below the ceramic membrane separator 4, the cross-flow valve 30 also serves as a one-place relief valve during relief, which is helpful for emptying the residual water.

The multi-stage filtration unit may have a first air supply switch 31 and a second air supply switch 32. The first air supply switch 31 may be connected with the water inlet cavity pipe of the ceramic membrane separator 4. The second air supply switch 32 may be connected with the water outlet cavity pipe of the ceramic membrane separator 4.

The pressure pump of the multi-stage filtration unit may include an electric booster pump 3-1 and a manual booster pump 3-2 which are connected in parallel on the pipe, and two parallel nodes are respectively provided with a three-way directional valve.

There is a pressure gauge on the pipe between the cross-flow valve 30 and the water inlet cavity of the ceramic membrane separator 4, and the pressure gauge is located on the operation panel. There is a flow meter on the pipe between the water outlet cavity of the multi-media filter 5 and the purified water outlet, and the flow meter is also located on the operation panel.

Figure 7:
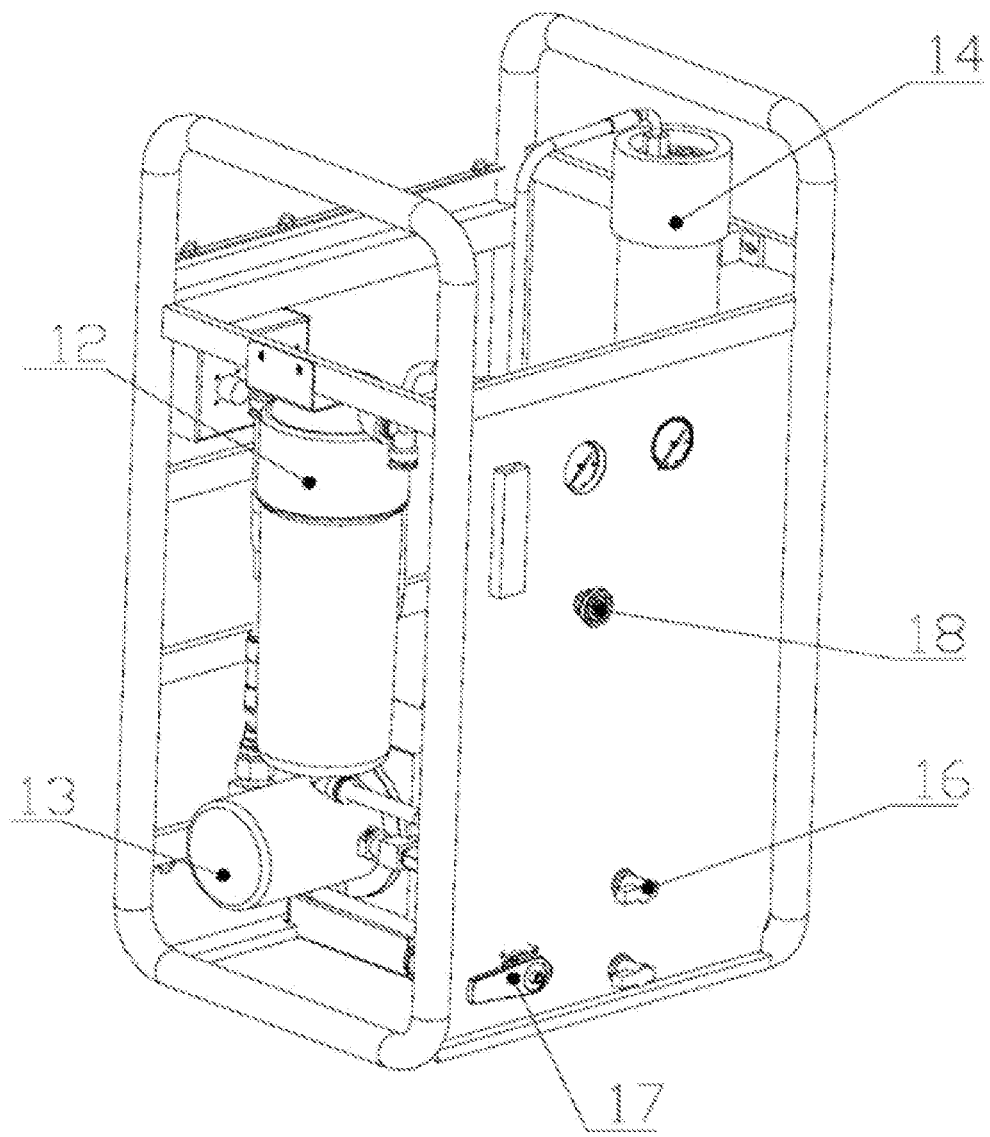
FIG. 7 illustrates a perspective view of a reverse osmosis unit according to some embodiments of the present disclosure.
Figure 8:
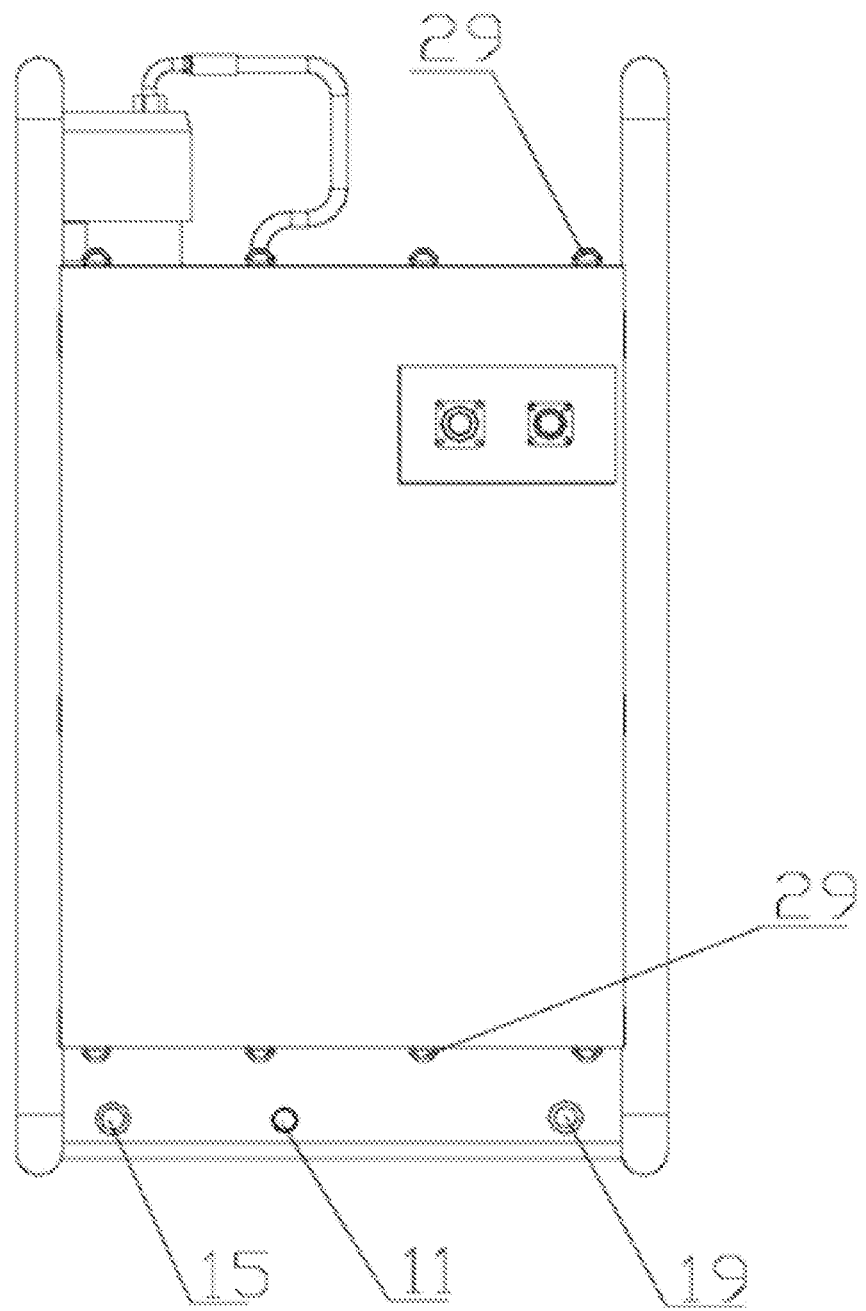
FIG. 8 illustrates a rear elevational view of a reverse osmosis unit according to some embodiments of the present disclosure.

FIG. 7 and FIG. 8 are schematic structural diagrams of reverse osmosis unit according to some embodiments of the present disclosure. The water treatment process of the unit is still shown in FIG. 3. The reverse osmosis unit may include a second raw water inlet 11, a second pre-filter 12, a high-pressure pump 13, a reverse osmosis membrane filter 14, and a second purified water outlet 15 connected by the pipe, where the second pre-filter 12, the high-pressure pump 13, and the reverse osmosis membrane filter 14 are fixed in the frame. The reverse osmosis unit may have a first relief valve 16, a second relief valve 17, and a shut-off regulating valve 18. The water inlet of the first relief valve 16 may be connected with the water outlet cavity pipe of the second pre-filter 12. The water inlet of the second relief valve 17 may be connected with the water outlet cavity pipe of the reverse osmosis membrane filter 14. The water inlet of the cut-off regulating valve 18 may be connected with the water inlet cavity pipe of the reverse osmosis membrane filter 14. The first relief valve 16, water outlets of the second relief valve 17, and the shut-off regulating valve 18 are connected with a second relief port 19 of the reverse osmosis unit. The first relief valve 16, the second relief valve 17, and the shut-off regulating valve 18 shown in FIG. 7 are three independent valves, but it is also possible to integrate two or all of the three valves. The shut-off regulating valve 18 may not only lead out the excess influent water of the reverse osmosis membrane filter 14, but also double as a positive flush valve of the reverse osmosis membrane filter 14.

The second pre-filter 12 may be a polypropylene (PP) cotton filter and/or a laminated filter.

The first relief valve 16 and the second relief valve 17 described in the reverse osmosis unit and the first relief switch, second relief switch, and third relief switch in the multi-stage filtration unit are on-off valves with the same structure, but different terms are used in the different unit.

Figure 9:
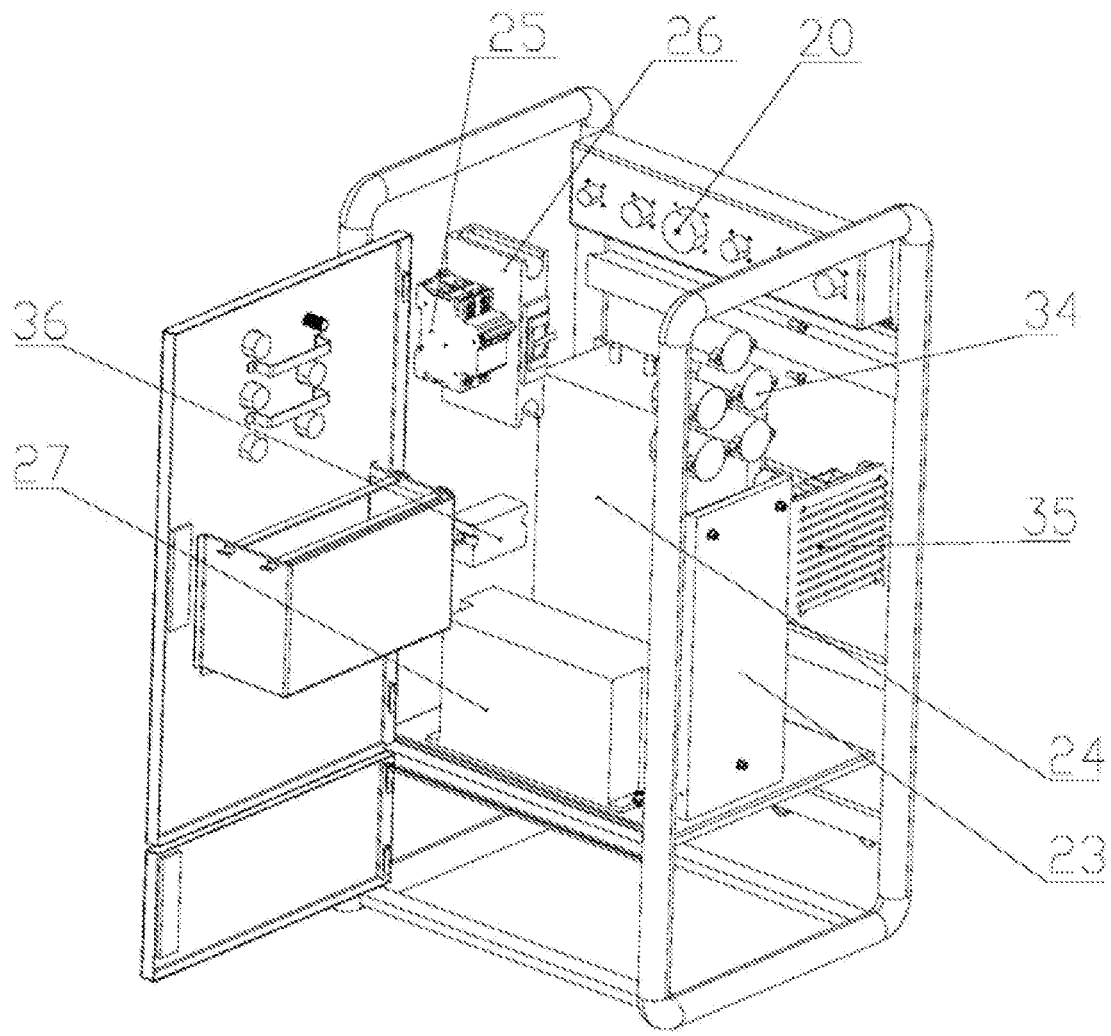
FIG. 9 illustrates a perspective view of the power control unit with the top panel and one side panel removed according to some embodiments of the present disclosure.
Figure 10:
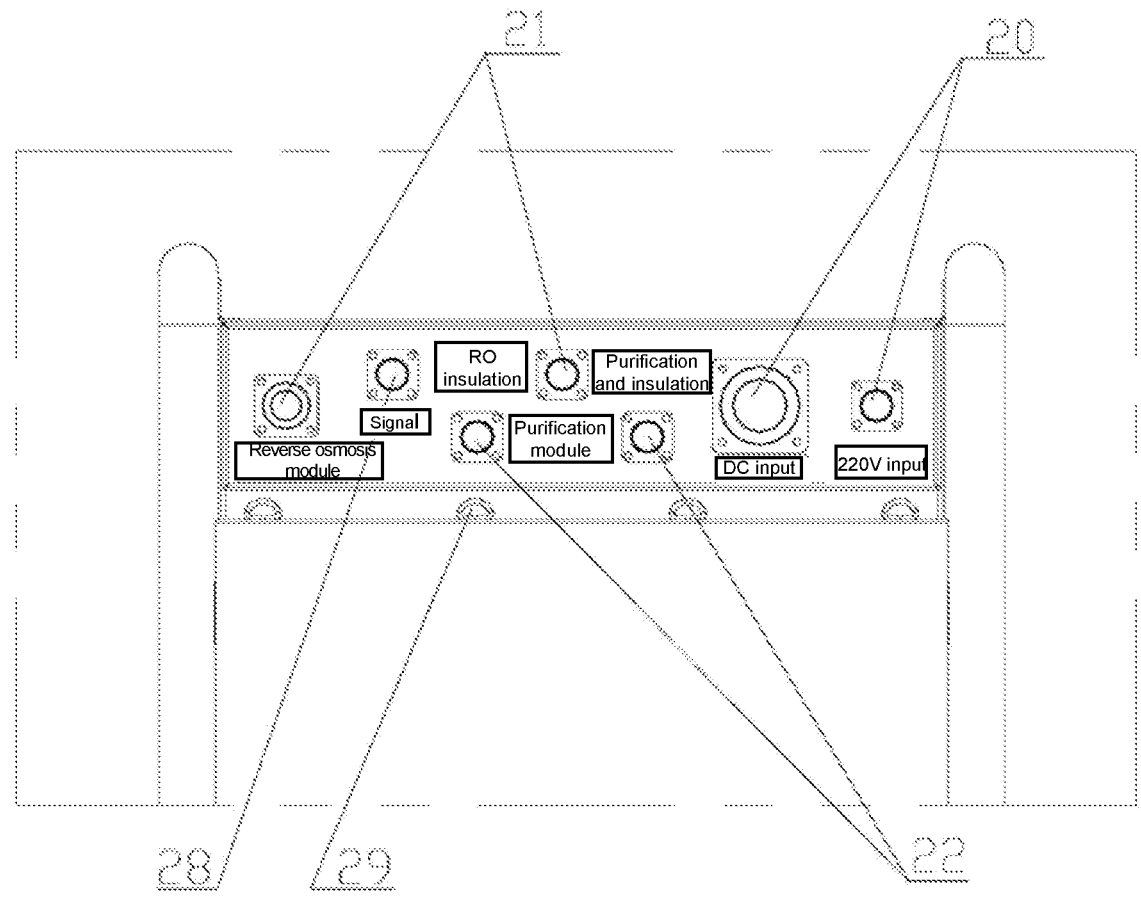
FIG. 10 illustrates a schematic diagram of the power and signal interfaces of the power control unit according to some embodiments of the present disclosure.
Figure 11:
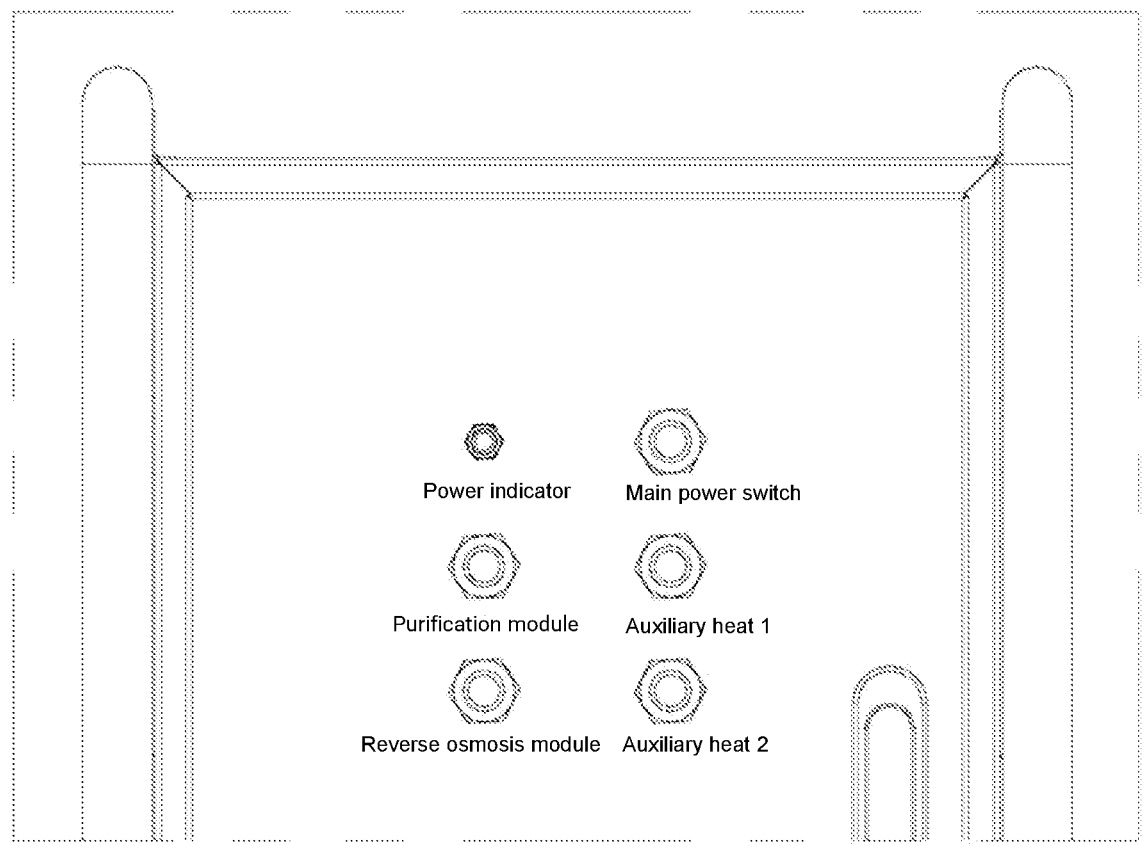
FIG. 11 illustrates a schematic diagram of buttons of the power control unit according to some embodiments of the present disclosure.
Figure 12:
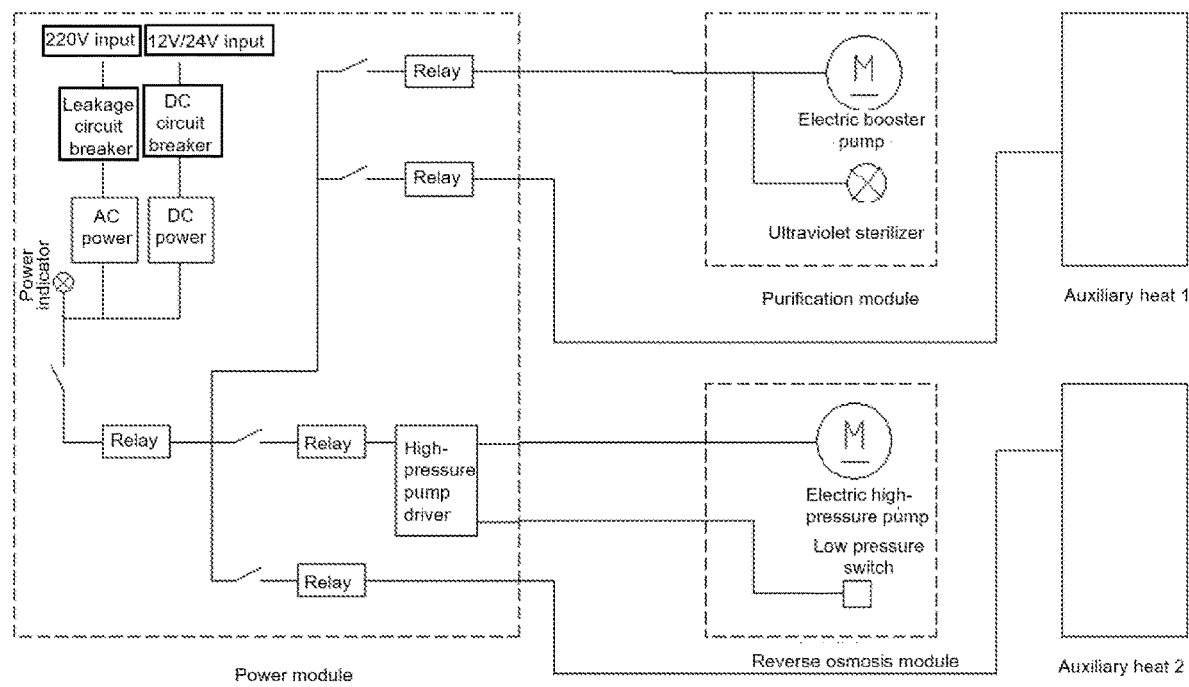
FIG. 12 illustrates a schematic diagram of supplying power according to some embodiments of the present disclosure.

FIG. 9, FIG. 10, and FIG. 11 are schematic structural diagrams of a power control unit according to some embodiments of the present disclosure. The principle of the power control unit is shown in FIG. 12. The frame of the power control unit has panels on six sides, and the panels may be provided with 220V Alternating Current (AC), 24V Direct Current (DC), and 12V DC power inlet. The panels may also be provided with a power outlet 21 for supplying 24V DC to the reverse osmosis unit and the multi-stage filtration unit of water treatment respectively and an auxiliary power outlet 22 for supplying 24V DC to heating jackets of the reverse osmosis unit and the multi-stage filtration unit respectively. The panels may also be provided with separate power output buttons for connecting power buttons, working power of the reverse osmosis unit and the multi-stage filtration unit, and power of the heating jacket. The auxiliary power outlet 22 may be electrically connected with the heating jacket. As shown in FIG. 12, each button may be connected with a relay 34. In the words printed on the product drawing panel of FIG. 11, the purification module may refer to the multi-stage filtration unit, and the reverse osmosis module may refer to the reverse osmosis unit. The heating jacket of the reverse osmosis unit and the multi-stage filtration unit may be heating devices that wrap the two units separately in field, and they need to be energized to realize the heating function. FIG. 11 shows auxiliary heat 1 and auxiliary heat 2, a power adapter in the frame may include a switching power supply 23 for converting 220V AC to 24V DC and a power converter 24 for converting 12V DC to 24V DC. The switching power supply 23 may include a leakage circuit breaker 25, and the power converter 24 may include a DC circuit breaker 26.

The frame of the power control unit may further be provided with a high-pressure pump driver 27 for adjusting rotational speed of the high-pressure pump 13 of the reverse osmosis unit. The high-pressure pump driver 27 may be located between the 24V DC power supply and a power supply interface of the reverse osmosis unit. The panel may be provided with a signal interface 28 for receiving an adjustment signal of the reverse osmosis unit. The signal interface 28 is electrically connected with the high-pressure pump driver 27, and the signal interface 28 is also connected with the low-pressure switch of the external reverse osmosis unit through a plug wire, the low-pressure switch may be the pressure regulating switch of the high-pressure pump. The high-pressure pump driver 27 controls the electrical connection form of the high-pressure pump rotor coil. The high-pressure pump driver 27 may control the operation of the high-pressure pump by adjusting the signal, so as to prevent the failure to start under different pressure and flow conditions, so as to satisfy the water treatment of the reverse osmosis membrane under different water quality and different water output requirements.

The panel of the power control unit may also be provided with a charging interface 36 for charging the outdoor lighting headlights, and the charging interface 36 may be electrically connected with the power adapter.

The panel of the power control unit may be provided with heat dissipation holes, and the frame corresponding to the heat dissipation holes may be provided with a fan 35, and the fan 35 may be electrically connected with the power adapter.

The power supply of the power control unit may be connected with a small generator that is also carried to move.

The frames of the above-mentioned multi-stage filtration unit, reverse osmosis unit, and power control unit may be respectively provided with buckle ears for carrying each unit, and curb size of each unit is less than or equal to 0.4 m×0.35 m×0.75 m, and curb weight is less than or equal to 30 kg.

In some embodiments, as a complete set of equipment for water treatment in field, the multi-stage filtration unit and the reverse osmosis unit may be used alone or in series in combination according to the water source. The basic situation may be: 1. the clean seawater may use reverse osmosis unit alone; 2. the fresh water that is dirty but not polluted by heavy metals may use multi-stage filtration unit alone; 3. the brackish water or fresh water polluted by heavy metals may use multi-stage filtration unit and reverse osmosis unit at the same time. The power control unit is a unit that needs to be used in various situations.

In some embodiments, the multi-stage filtration treatment is preceded by the reverse osmosis treatment. As shown in FIG. 2, FIG. 3 and FIG. 12, the raw water may enter the first pre-filter 2 to remove particulate matter in the raw water for preventing damage to the pressure pump and reducing the operating load of the ceramic membrane separator 4 at the same time. The treated water may be discharged from the first water purified outlet 7 after separation, filtration, and sterilization, and the discharged water may be used as the raw water of the reverse osmosis unit and be fed into the reverse osmosis unit. When used in combination, the second pre-filter 12 basically has no filtering effect due to the large filter pores and has little resistance to water. There is another way of using in combination, which is to deal with the raw water that is slightly polluted but has no peculiar smell in the field. At this time, through the water purification mode switching valve 10, the water outlet cavity of the ceramic membrane separator 4 may be directly connected with the reclaimed water outlet, and the reclaimed water outlet is connected with the reverse osmosis unit to form drinking water.

Figure 4:
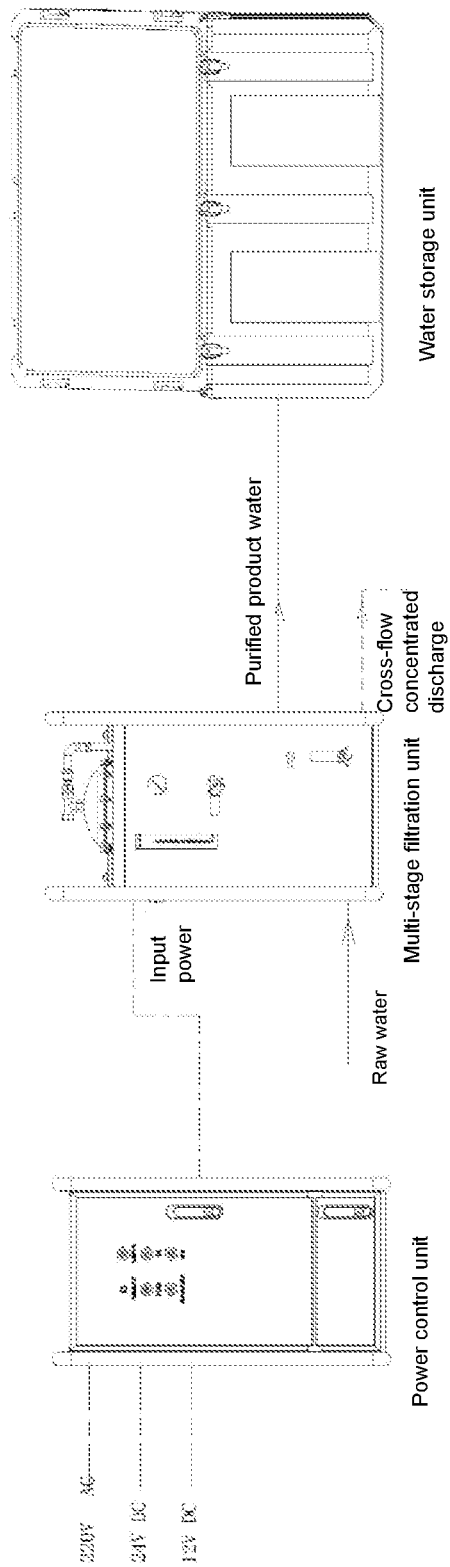
FIG. 4 illustrates a combined relationship diagram when a reverse osmosis unit is not used according to some embodiments of the present disclosure.

A single use case is shown in FIG. 4, only multi-stage filtration units are used. This use method is generally used in the production of domestic water and drinking water, but the raw water is not chemically polluted.

When the complete set of water treatment equipment is out of use and ready to be transferred or not in use at night at low temperature, the residual water in the multi-stage filtration unit and reverse osmosis unit may be discharged. The multi-stage filtration unit opens the third relief valve 33, that is, the first relief switch, the second relief switch and the third relief switch are opened, and the first air supply switch 31 and the second air supply switch 32 are opened, making each filter drain quickly with air supply. The reverse osmosis unit opens the first relief valve 16, the second relief valve 17, and the shut-off regulating valve 18 to drain water. Since the reverse osmosis unit has only one filter, but has three drain valves, the residual water may be drained smoothly without the air supply device. In addition, because the pipe of the reverse osmosis unit needs to withstand a certain high-pressure, the performance requirements of the installed air supply valve may be higher, and the use of the air supply valve may be redundant.

FIG. 13 illustrates a schematic diagram of using a water storage unit to accommodate other units according to some embodiments of the present disclosure. In some embodiments, the water storage unit may include a water volume sensing device. The aforementioned water volume sensing device may be used to detect a water volume of purified water in the water storage unit. When the aforementioned water volume is lower than a water volume threshold, a water shortage reminder may be issued. The water volume threshold may be the minimum value of purified water preset by the user. In response to the water shortage reminder, the water delivery device may extract raw water for purification treatment.

Figure 14:
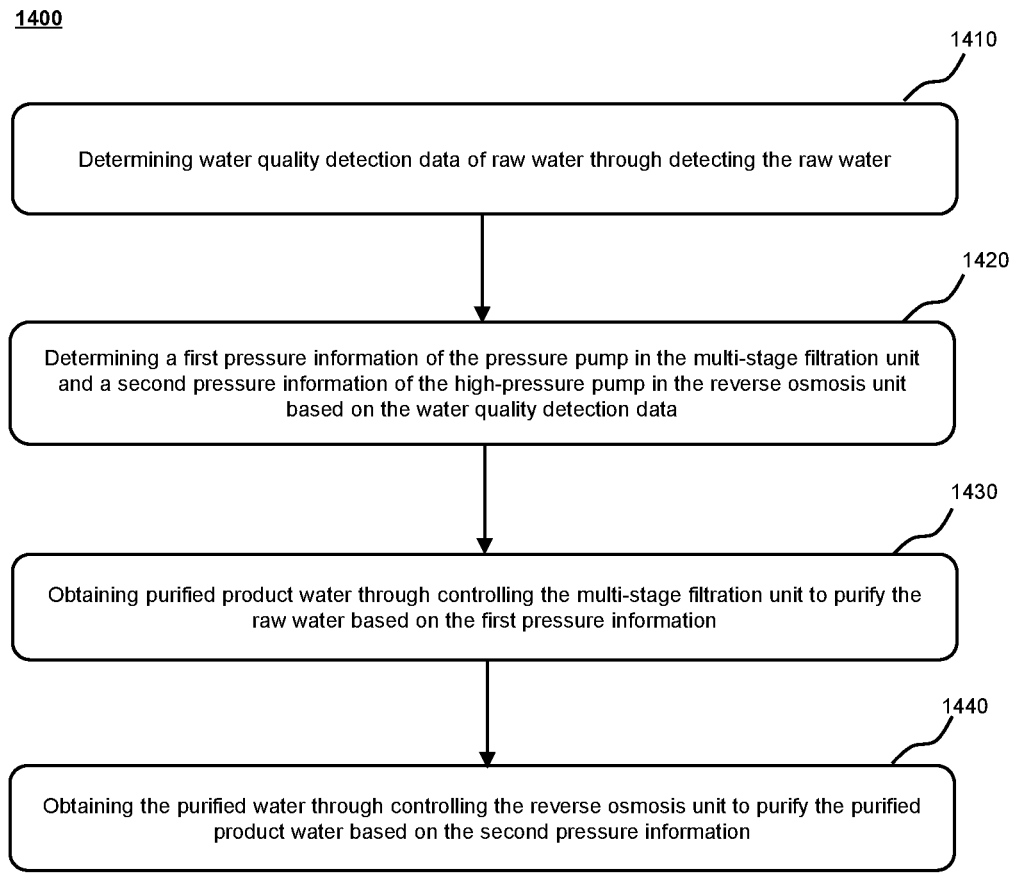
FIG. 14 illustrates an exemplary flowchart of obtaining purified water through processing raw water according to some embodiments of the present disclosure.

FIG. 14 illustrates an exemplary flowchart of obtaining purified water through processing raw water according to some embodiments of the present disclosure. In some embodiments, a process 1400 may be performed by complete set of equipment 100 for supplying drinking water in field. As shown in FIG. 14, the process 1400 may include the following operations.

In operation 1410, water quality detection data of raw water may be determined through detecting the raw water. In some embodiments, the operation may be performed by the water quality detection unit 150.

The water quality detection data may refer to data related to chemical indicators, physical indicators, and microbial indicators of raw water. For example, the water quality detection data may include data such as particle concentration, heavy metal content, and microorganism content. In some embodiments, the water quality detection unit may include various detection instruments. The aforementioned various detection instruments are used to detect the data related to various chemical indicators, physical indicators, and microbial indicators in the raw water. For example, the water quality detection unit may include a suspended matter analyzer for determining the concentration of particulate matter in the raw water. The water quality detection unit may further include a visible spectrophotometer for determining the heavy metal content in the raw water. The water quality detection unit may also include a microbial detector for determining the microbial content in raw water, etc.

In operation 1420, a first pressure information of the pressure pump in the multi-stage filtration unit and a second pressure information of the high-pressure pump in the reverse osmosis unit may be determined based on the water quality detection data. In some embodiments, the operation may be performed by a processing unit.

The pressure pump may be a component that generates pressure on the raw water in the multi-stage filtration unit and promotes the raw water to pass through the multi-stage filtration unit to achieve filtration. The pressure pump may include an electric booster pump and a manual booster pump.

The first pressure information may be the pressure or pressure intensity applied by the pressure pump to the raw water during the filtration process. The first pressure information may include one or more pressure data. For example, each filter layer of a multi-stage filtration unit may correspond to a different pressure. Correspondingly, the first pressure information may include the respective pressures required by the raw water when the raw water is treated by the first pre-filter, the ceramic membrane separator, and the multi-media filter, or the like.

It should be understood that the size of each pressure data in the first pressure information may be the same or different. When the size of each pressure data in the first pressure information is different, there may be a corresponding relationship between each pressure data, so as to ensure the normal performance of the filtering process of the multi-stage filtration unit. The aforementioned corresponding relationship may be preset according to experience. For example, the pressure required for the raw water to be treated by the ceramic membrane separator and the multi-media filter in the multi-stage filtration unit may both be 0.8 MPa. For another example, when the ceramic membrane separator and the multi-media filter in the multi-stage filtration unit treat the raw water, the ratio of the pressure required by the ceramic membrane separator and the multi-media filter may be 1:1.2.

The high-pressure pump may be a component that generates high-pressure in the reverse osmosis unit to facilitate the permeation of the purified product water through the reverse osmosis membrane filter to achieve the effect of reverse osmosis. The high-pressure pump may be an electric booster pump. The high-pressure pump may include a high-pressure pump driver for controlling the operation of the high-pressure pump.

The second pressure information may be the pressure or pressure intensity applied by the high-pressure pump to the purified product water during the reverse osmosis process.

In some embodiments, the first pressure information and the second pressure information may be determined by preset values. For example, the pressure pump and the high-pressure pump may be manually preset with specific pressure values. In some embodiments, the first pressure information and the second pressure information may be determined by a pressure determination model. For specific descriptions of determining the first pressure information and the second pressure information through the pressure determination model, please refer to FIG. 15 and its related descriptions.

In operation 1430, purified product water may be obtained through controlling the multi-stage filtration unit to purify the raw water based on the first pressure information. In some embodiments, the operation may be performed by the processing unit.

The processing unit may control the multi-stage filtration unit to filter the raw water based on the first pressure information to obtain purified product water. The purified product water may be reclaimed water after being filtered and processed by a multi-stage filtration unit. The insoluble matter has been filtered out in the purified water, but there may be heavy metal ion impurities dissolved in the water and excess microorganisms.

In operation 1440, the purified water may be obtained through controlling the reverse osmosis unit to purify the purified product water based on the second pressure information. In some embodiments, the operation may be performed by the processing unit.

The processing unit may control the reverse osmosis unit to perform reverse osmosis on the purified produced water based on the second pressure information to obtain purified water. The purified water may refer to pure water that may be drunk.

Through the treatment process of the raw water described in some embodiments of the present disclosure, the water quality of the raw water may be detected during the process of obtaining purified water, which is beneficial to further understand the pollution degree of the raw water. Based on the pollution degree of the raw water, the appropriate pressure information applied to each processing link is determined when the raw water is treated, so as to ensure the stable operation of the complete set of equipment for supplying drinking water in field.

Figure 15:
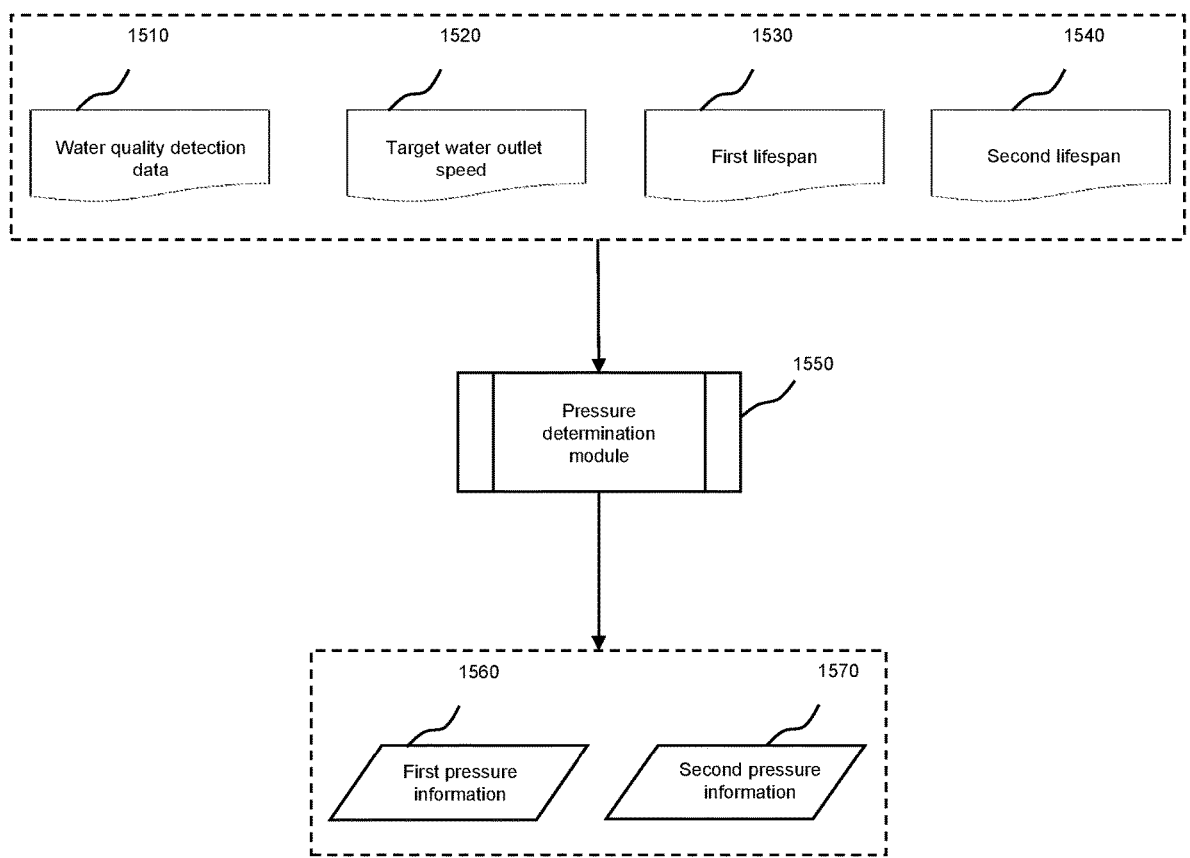
FIG. 15 illustrates a schematic diagram of a pressure determination model according to some embodiments of the present disclosure.

FIG. 15 illustrates a schematic diagram of a pressure determination model according to some embodiments of the present disclosure.

In some embodiments, the first pressure information and the second pressure information may be determined based on a pressure determination model processing the water quality detection data, the target water outlet speed, the first lifespan, and the second lifespan. The pressure determination model may include, but is not limited to, a support vector machine model, a deep neural network model, or the like.

The target water outlet speed may be the purified water outlet speed desired by the user. For example, the target water outlet speed may be preset by the user according to the user's needs. In some embodiments, the processing unit may obtain the target water outlet speed of the purified water.

The first lifespan may be the remaining lifespan of the multi-stage filtration unit at the current moment. The first lifespan may include the remaining lifespan of each filter layer at the current time point. The second lifespan may be the remaining lifespan of the reverse osmosis unit at the current moment. The second lifespan may include the remaining lifespan of each reverse osmosis membrane at the current time point. In some embodiments, the processing unit may obtain the first lifespan of the multi-stage filtration unit at current and the second lifespan of the reverse osmosis unit at current. The first lifespan and the second lifespan may be obtained in various ways. For example, it may be obtained by user input. For another example, the first lifespan and the second lifespan may be obtained by a machine learning model. For the specific contents of obtaining the first lifespan and the second lifespan based on the machine learning model, please refer to FIG. 18, FIG. 19, and related descriptions.

As shown in FIG. 15, the input of the pressure determination model 1550 may include water quality detection data 1510, target water outlet speed 1520, first lifespan 1530, and second lifespan 1540, and the output of the pressure determination model 1550 may include first pressure information 1560 and second pressure information 1570.

In some embodiments, the pressure determination model may be trained through training samples with a plurality of labels. The training samples may include the water quality detection data, the target water outlet speed, and the remaining lifespan of the multi-stage filtration unit and the reverse osmosis unit at the sample time point. The labels of the training samples may be the first pressure information and the second pressure information when the raw water at the aforementioned sample time point is purified. The remaining lifespan of the multi-stage filtration unit and the reverse osmosis unit at the sample time point may be obtained by manually detecting the corresponding units. Other data of the training samples and labels may be obtained from the historical data in the storage unit. A plurality of training samples may be input to the initial pressure determination model, a loss function may be constructed from the labels and the outputs of the initial pressure determination model, and the parameters of the initial pressure determination model may be iteratively updated based on the loss function. When the loss function of the initial pressure determination model satisfies the preset condition, the model training is completed, and the trained pressure determination model is obtained. The preset conditions may be that the loss function converges, the count of iterations reaches a threshold, or the like.

Through the pressure determination model described in some embodiments of the specification, the first pressure information required by the pressure pump and the second pressure information required by the high-pressure pump are determined when the target water outlet speed is reached. Thereby, control commands may be sent to the pressure pump and the high-pressure pump to control the working parameters of the pressure pump and the high-pressure pump. It is beneficial to ensure the stability of the pressure according to the water quality information and equipment life information, so as to meet the needs of the user's water outlet speed.

Figure 16:
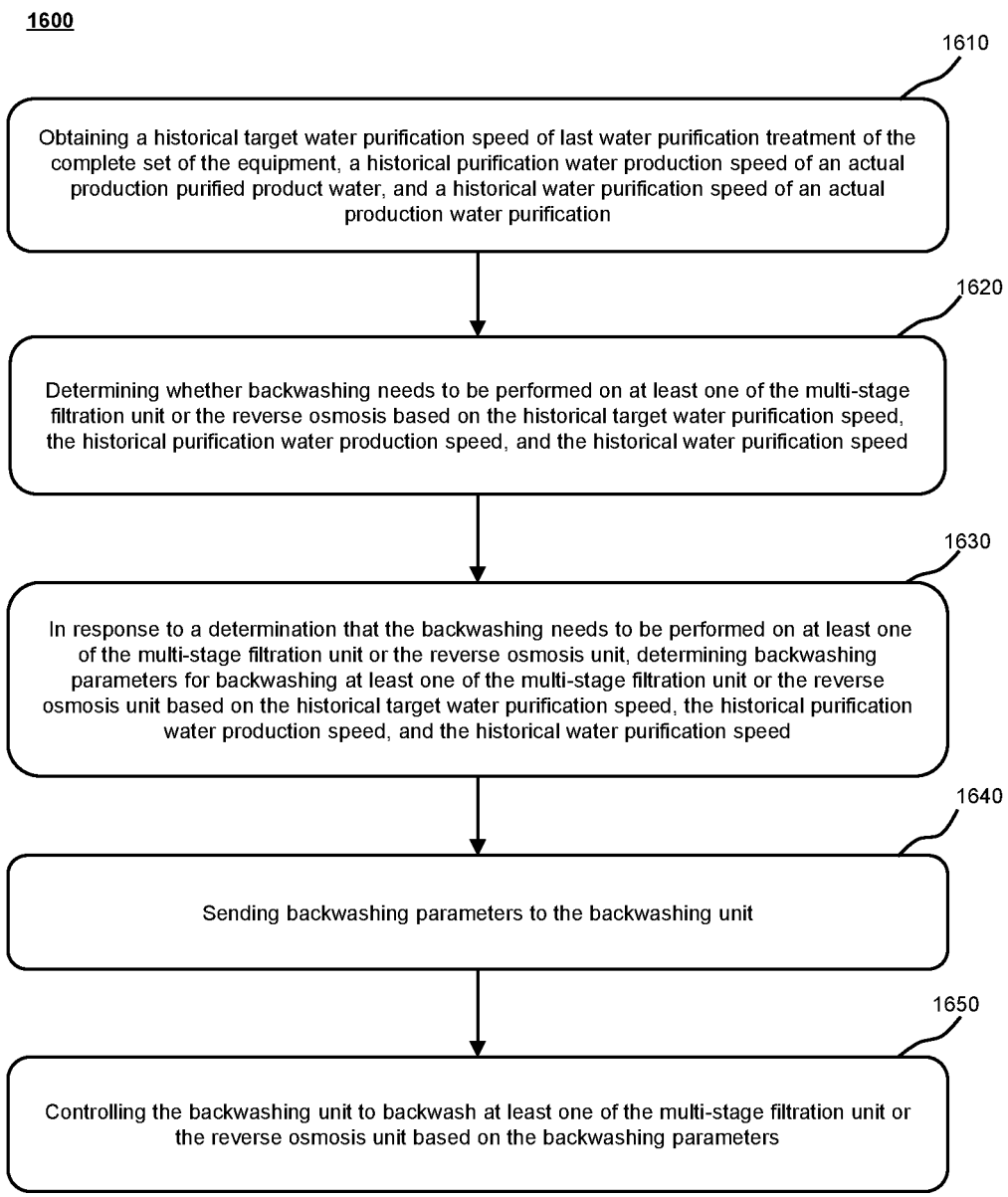
FIG. 16 illustrates an exemplary flowchart of a backwashing process according to some embodiments of the present disclosure.

FIG. 16 illustrates an exemplary flowchart of a backwashing process according to some embodiments of the present disclosure. In some embodiments, the process 1600 may be performed by the complete set of equipment 100 for supplying drinking water in field. As shown in FIG. 16, the process 1600 may include the following operations.

In operation 1610, a historical target water purification speed of last water purification treatment of the complete set of the equipment, a historical purification water production speed of an actual production purified product water, and a historical water purification speed of an actual production water purification may be obtained. In some embodiments, the operation may be performed by the processing unit.

The historical target water purification speed may be the water purification speed set by the user during the last water purification treatment. The historical target water purification speed may be determined by user input or by calling historical data.

The historical purification water production speed may be the speed of the production of purified product water during the last filtration of the multi-stage filtration unit. The historical purification water production speed may be determined from historical data measured by the electromagnetic flowmeter of the multi-stage filtration unit.

The historical water purification speed may be the speed of production of purified water during the last reverse osmosis performed by the reverse osmosis unit. The historical water purification speed may be determined from historical data measured by the electromagnetic flowmeter of the reverse osmosis unit.

The storage unit may store the target water purification speed for each water purification treatment, the purification water production speed for each filtration, and the water purification speed for each reverse osmosis. The above speeds may be used as the corresponding historical target water purification speed, historical purification water production speed, and historical water purification speed. When the processing unit executes the process 1600, the above data may be called from the storage unit. For example, a certain target water purification speed stored may be used as the historical target water purification speed.

In operation 1620, whether backwashing needs to be performed on at least one of the multi-stage filtration unit or the reverse osmosis unit may be determined based on the historical target water purification speed, the historical purification water production speed, and the historical water purification speed. In some embodiments, the operation may be performed by the processing unit.

The backwashing may be a process in which a certain amount of purified water is pressurized and accelerated through the units in reverse. The backwashing may clean the multi-stage filtration unit or reverse osmosis unit of the complete set of equipment for supplying drinking water in field by high-pressure water flow, so that the multi-stage filtration unit or reverse osmosis unit may restore the filtration/reverse osmosis capacity.

In some embodiments, whether backwashing needs to be performed on at least one of the multi-stage filtration unit or the reverse osmosis unit may be determined based on the historical target water purification speed, the historical purification water production speed, and the historical water purification speed. When the historical water purification speed is lower than the historical target water purification speed, and the speed difference between the historical water purification speed and the historical target water purification speed is greater than the first speed difference threshold, it means that at least one of the multi-stage filtration unit or reverse osmosis unit may contain more impurities and needs to be performed backwashing process. When the difference between the historical water purification speed and the historical target water purification speed corresponding to the historical target water purification speed is less than or equal to the second speed difference threshold, it means that the multi-stage filtration unit does not contain many impurities, and the reason that the historical water purification speed is too slow is that the reverse osmosis unit contains more impurities, at this time, it is not necessary to backwash the multi-stage filtration unit. When the difference between the historical water purification speed and the historical target water purification speed corresponding to the historical target water purification speed is greater than the second speed difference threshold, it means that the multi-stage filtration unit contains more impurities, and the multi-stage filtration unit and the reverse osmosis unit may be backwashed. The corresponding relationship between the historical target water purification speed and the historical target water purification speed may be preset. The above-mentioned speed difference thresholds may be determined by manual setting. In some embodiments, the processing unit may further determine whether to perform backwashing on at least one of the multi-stage filtration unit or the reverse osmosis unit through a backwashing model. For specific descriptions of the backwashing model, please refer to FIG. 17 and its related descriptions.

In operation 1630, in response to a determination that the backwashing needs to be performed on at least one of the multi-stage filtration unit or the reverse osmosis unit, backwashing parameters for backwashing at least one of the multi-stage filtration unit or the reverse osmosis unit may be determined based on the historical target water purification speed, the historical purification water production speed, and the historical water purification speed. In some embodiments, the operation may be performed by the processing unit.

The backwashing parameters may be parameters related to the backwashing process. The backwashing parameters may include, but are not limited to, backwashing water flow speed, backwashing time, units requiring backwashing, or the like. The backwashing parameters may be determined in various ways. For example, the backwashing parameter may be determined based on the historical target water purification speed, the historical purification water production speed, and the historical water purification speed in combination with a preset relationship. In some embodiments, backwashing parameters may also be determined by a backwashing model. For the specific descriptions of the backwashing model, please refer to FIG. 17 and its related descriptions.

In operation 1640, backwashing parameters may be sent to the backwashing unit. In some embodiments, the operation may be performed by the processing unit.

In operation 1650, the backwashing unit may be controlled to backwash at least one of the multi-stage filtration unit or the reverse osmosis unit based on the backwashing parameters. In some embodiments, the operation may be performed by the processing unit.

The backwashing unit may reverse the flow of purified water through a multi-stage filtration unit or a reverse osmosis unit to flush impurities. The backwashing unit may include structures such as a backwashing pressure pump, a water source, or the like. The backwashing unit may also include a cleaner for applying a cleaning agent in the flow of purified water. The backwashing unit may also realize the washing of impurities by means of high-pressure air flow and water-air combination. For example, the surface of the filter layer of the multi-stage filtration device may be washed by high-pressure air flow to separate the impurities on the surface of the filter layer.

The processing unit may control the backwashing unit to perform the backwashing process based on the backwashing parameters. For example, the processing unit may import the backwashing parameters into the backwashing unit, and the backwashing unit determines the backwashing water flow speed, the backwashing time, the unit that needs backwashing, or the like based on the backwashing parameters.

Some embodiments of the present disclosure first judge whether backwashing is necessary based on the purified water production and water purification speed, and then determine the specific parameters of the backwashing, which may control the backwashing parameters pertinently. Under the premise of not damaging each unit, the high-pressure water flow is controlled to clean each unit to ensure its function and prolong its service life.

Figure 17:
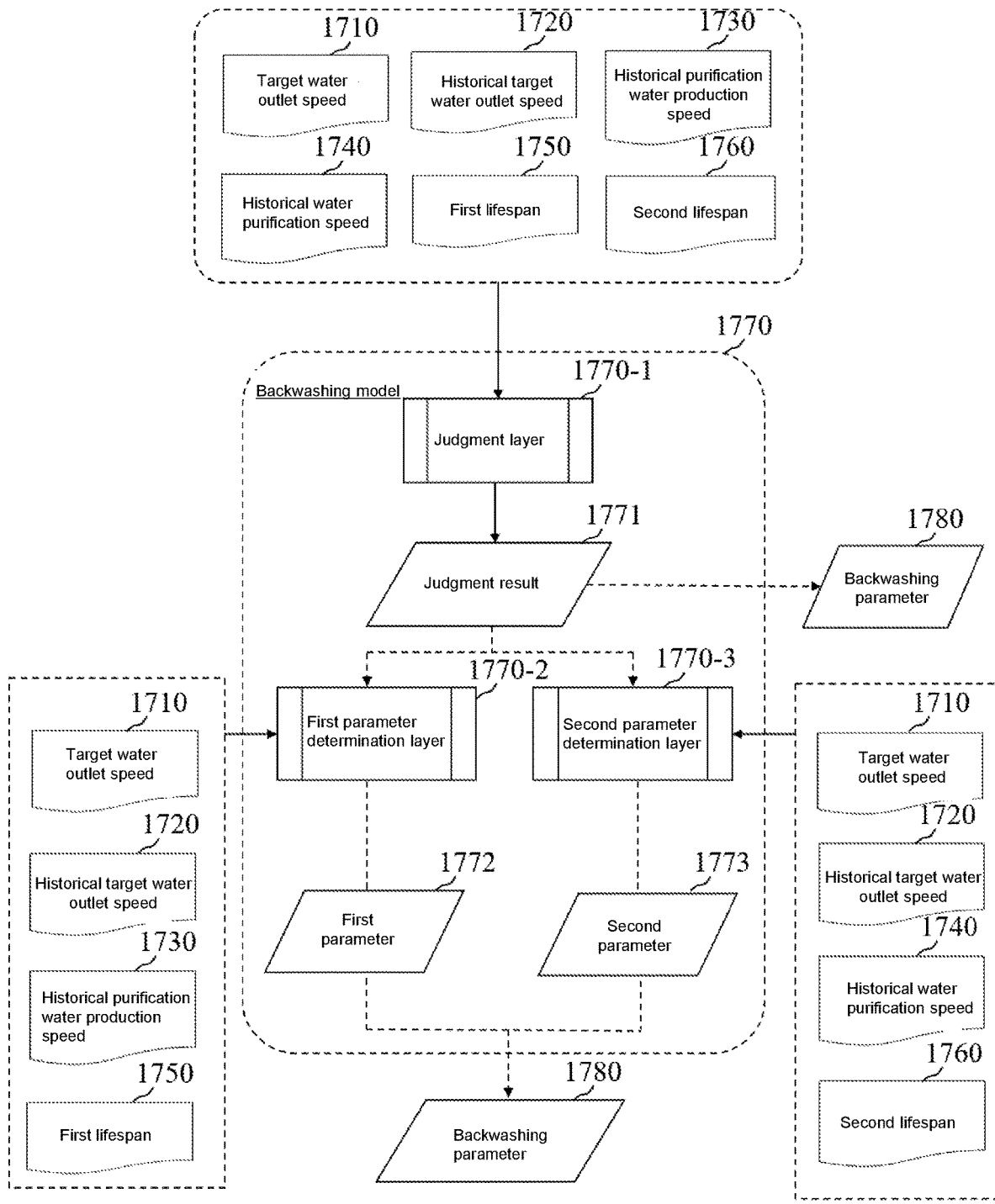
FIG. 17 illustrates a schematic diagram of a backwashing model according to some embodiments of the present disclosure.

FIG. 17 illustrates a schematic diagram of a backwashing model according to some embodiments of the present disclosure.

The backwashing model may be a machine learning model for generating backwashing parameters. The backwashing model may be a deep neural network model.

In some embodiments, the processing unit may obtain the target water outlet speed of purified water, the first lifespan of the multi-stage filtration unit at current, and the second lifespan of the reverse osmosis unit at current. For the specific contents of obtaining the target water outlet speed of the purified water, the first lifespan of the multi-stage filtration unit at current, and the second lifespan of the reverse osmosis unit at current, please refer to FIG. 15 and its related descriptions.

In some embodiments, the processing unit may determine the backwashing parameters based on a backwashing model processing the historical target water purification speed, the historical purification water production speed, the historical water purification speed, the historical water purification speed, the first lifespan, and the second lifespan.

As shown in FIG. 17, the backwashing model 1770 may include a judgment layer 1770-1, a first parameter determination layer 1770-2, and a second parameter determination layer 1770-3. The input of the judgment layer 1770-1 may include the target water outlet speed 1710, the historical target water outlet speed 1720, the historical purification water production speed 1730, the historical water purification speed 1740, the first lifespan 1750 and the second life 1760, and the output of the judgment layer 1770-1 may include the judgment results 1771 of the unit that needs to be washed. The judgment results may include no need for backwashing and need for backwashing of the multi-stage filtration unit and/or reverse osmosis unit. When the judgment result is no need for backwashing, the backwashing model may output preset backwashing parameters, and each specific parameter of the preset backwashing parameters may be 0 for indicating that backwashing is not required. When the judgment result is need for backwashing the multi-stage filtration unit and/or the reverse osmosis unit, the judgment result may be input into the corresponding parameter layer. When the judgment result is need for backwashing the multi-stage filtration unit, the judgment result may be input into the first parameter determination layer. When the judgment result is need for backwashing the reverse osmosis unit, the judgment result may be input into the second parameter determination layer. When the judgment result is need for backwashing the multi-stage filtration unit and the reverse osmosis unit, the judgment result may be input into the first parameter determination layer and the second parameter determination layer.

When the judgment results 1771 include that the multi-stage filtration unit needs to be backwashed, the input of the first parameter determination layer 1770-2 may include the target water outlet speed 1710, the historical target water outlet speed 1720, the historical purification water production speed 1730 and the first lifespan 1750, the output of the first parameter determination layer 1770-2 may include a first parameter 1772. When the judgment results 1771 include that the reverse osmosis unit needs to be backwashed, the input of the second parameter determination layer 1770-3 may include the target water outlet speed 1710, the historical target water outlet speed 1720, the historical water purification speed 1740, and the second lifespan 1760, the output of the second parameter determination layer 1770-3 may include a second parameter 1773. The first parameter may be a backwashing parameter for backwashing the multi-stage filtration unit, and the second parameter may be a backwashing parameter for backwashing the reverse osmosis unit. When the judgment result 1771 is that the multi-stage filtration unit or the reverse osmosis unit needs to be backwashed, the corresponding first parameter 1772 or the second parameter 1773 may be directly determined as the backwashing parameter 1780. When the judgment result 1771 is that the multi-stage filtering unit and the reverse osmosis unit need to be backwashed, the first parameter 1772 and the second parameter 1773 may be determined as a backwashing parameter 1780.

In some embodiments, the backwashing model may be obtained by training a plurality of labeled training samples. A plurality of labeled training samples may be input into the initial backwashing model, and a loss function may be constructed from the labels and the outputs of the initial backwashing model, and the parameters of the initial backwashing model may be iteratively updated by gradient descent or other methods based on the loss function. When the preset conditions are met, the model training is completed, and the trained backwashing model is obtained. The preset conditions may be that the loss function converges, the count of iterations reaches a threshold, or the like. The training samples may include the historical target water outlet speed, historical purification water production speed, historical water purification speed, the remaining lifespan of the multi-stage filtration unit and the reverse osmosis unit at the first sample time point, and the target water outlet speed at the second sample time point. The label may be a backwashing parameter corresponding to the above-mentioned training sample at the second sample time point. The first sample time point may be earlier than the second sample time point. Labels may be obtained based on historical data annotations.

In some embodiments, the backwashing model may also be obtained through joint training with the first lifespan determination model and the second lifespan determination model. For specific descriptions of joint training, please refer to FIG. 19 and its related descriptions.

Through the backwashing model described in some embodiments of the present disclosure, it is possible to determine whether the backwashing process is carried out, and the specific backwashing parameters corresponding to the backwashing process for the specific conditions of different purification water production speeds and water purification speeds. In the way, the labor cost of manually setting backwashing parameters may be reduced, and under the premise of ensuring the backwashing effect, unit damage or waste of water resources caused by inappropriate backwashing parameters may be avoided.

Figure 18:
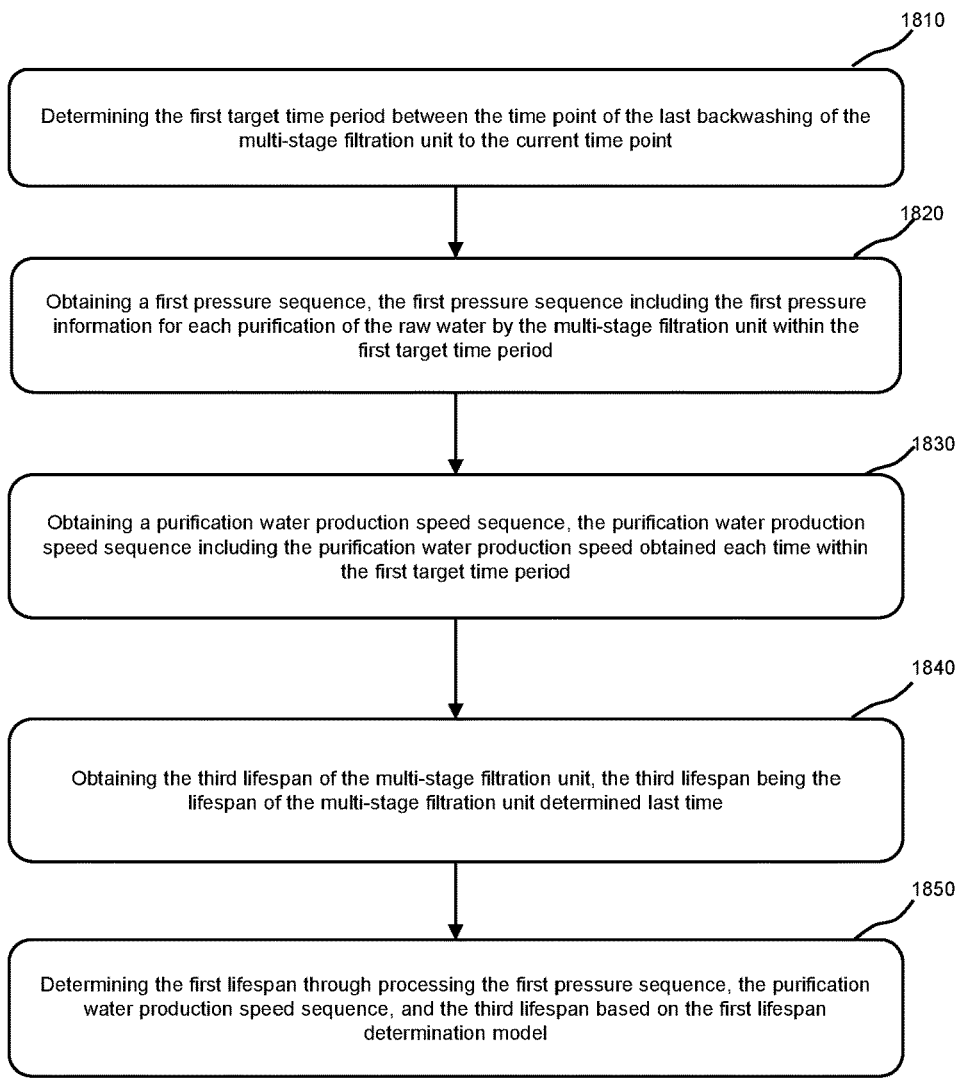
FIG. 18 illustrates an exemplary flowchart for determining the first lifespan according to some embodiments of the present disclosure.

FIG. 18 illustrates an exemplary flowchart for determining the first lifespan according to some embodiments of the present disclosure. In some embodiments, a process 1800 may be performed by the processing unit. As shown in FIG. 18, the process 1800 may include the following operations.

In operation 1810, the first target time period between the time point of the last backwashing of the multi-stage filtration unit to the current time point may be determined.

The first target time period may refer to the time period between the time point of the last time backwashing of the multi-stage filtration unit to the current time point. The first target time period may be obtained according to the time when the multi-stage filtration unit was backwashed last time stored in the storage unit.

In operation 1820, a first pressure sequence may be obtained, the first pressure sequence including the first pressure information for each purification of the raw water by the multi-stage filtration unit within the first target time period.

The first pressure sequence may refer to a sequence of first pressure information for each purification of the raw water by the multi-stage filtration unit within the first target time period. The first pressure sequence may be determined based on the first pressure information stored in the storage unit for each purification of the raw water by the multi-stage filtration unit within the first target time period and the corresponding time.

In operation 1830, a purification water production speed sequence may be obtained, the purification water production speed sequence including the purification water production speed obtained each time within the first target time period.

The purification water production speed sequence may refer to a sequence of obtaining purification water production speed of purified product water each time within the first target time period. The purification water production speed sequence may be determined based on the purification water production speed stored in the storage unit, which is obtained each time within the first target time period, and the corresponding time.

In operation 1840, the third lifespan of the multi-stage filtration unit may be obtained, and the third lifespan is the lifespan of the multi-stage filtration unit determined last time.

The third lifespan may be obtained by the last output of the first pressure determination model stored in the storage unit. When the last output of the first pressure determination model is not stored in the storage unit, the third lifespan may be determined by preset.

In operation 1850, the first lifespan may be determined through processing the first pressure sequence, the purification water production speed sequence, and the third lifespan based on the first lifespan determination model.

A first lifespan determination model may be used to determine the remaining lifespan of the multi-stage filtration unit. The first lifespan determination model may include, but is not limited to, a recurrent neural network model, a long short-term memory network model, or the like.

In some embodiments, the first lifespan of the multi-stage filtration unit may be determined through processing the first pressure sequence, the purification water production speed sequence, and the third lifespan by the first lifespan determination model. The input of the first lifespan determination model may include the first pressure sequence, the actual purification water production speed sequence, and the third lifespan data, and the output of the first lifespan determination model may be the first lifespan.

In some embodiments, the first lifespan determination model may be trained from a plurality of labeled training samples. The training samples may include the first pressure sequence, the purification water production speed sequence within the time period corresponding to the third sample time point and the fourth sample time point, and the last determined remaining lifespan of the multi-stage filtration unit within the aforementioned time period. The label of the training sample may be the remaining lifespan of the multi-stage filtration unit at the fourth sample time point. In the aforementioned time period, the multi-stage filtration unit may be backwashed only at the third sample time point, and the third sample time point is earlier than the fourth sample time point. The aforementioned two remaining lifespans may be obtained by manually marking after detecting the multi-stage filtration unit at the corresponding time point, and other data in the training sample may be obtained through the historical data in the storage unit. A plurality of labeled training samples may be input into the initial first lifespan determination model, and a loss function may be constructed according to the labels and the outputs of the initial first lifespan determination model. The parameters of the first lifespan determination model may be iteratively updated according to the loss function. When the loss function satisfies the preset conditions of the initial first lifespan determination model, the model training is completed, and the trained first lifespan determination model is obtained. The preset conditions may be that the loss function converges, the count of iterations reaches a threshold, etc.

Figure 19:
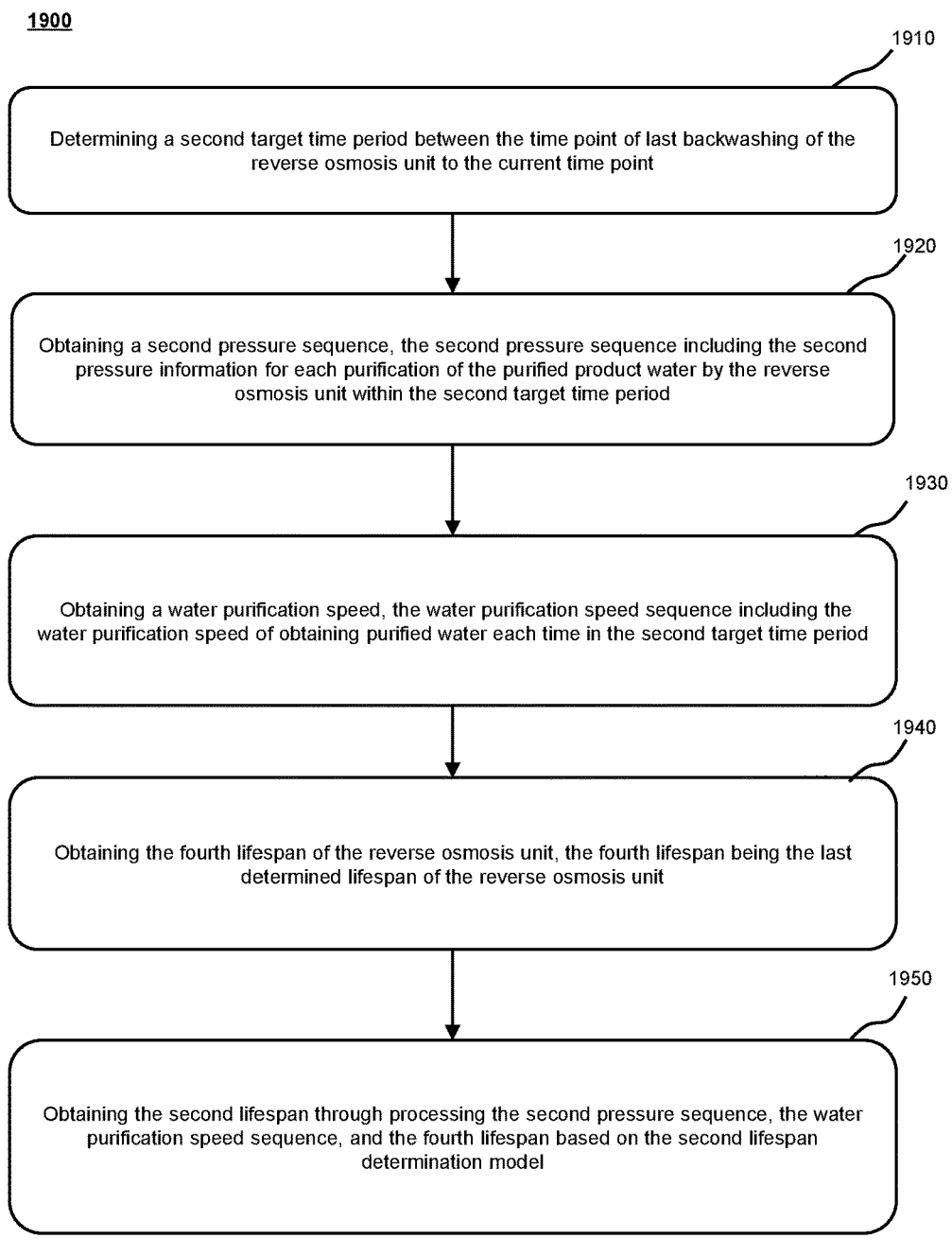
FIG. 19 illustrates an exemplary flowchart for determining the second lifespan according to some embodiments of the present disclosure.

FIG. 19 illustrates an exemplary flowchart for determining the second lifespan according to some embodiments of the present disclosure. In some embodiments, a process 1900 may be performed by the processing unit. As shown in FIG. 19, the process 1900 may include the following operations.

In operation 1910, a second target time period between the time point of the last backwashing of the reverse osmosis unit to the current time point may be determined.

The second target time period may refer to the time period between the time point of the last backwashing of the reverse osmosis unit to the current time point. The second target time period may be obtained according to the time when the reverse osmosis unit was backwashed last time stored in the storage unit.

In operation 1920, a second pressure sequence may be obtained, the second pressure sequence including the second pressure information for each purification of the purified product water by the reverse osmosis unit within the second target time period.

The second pressure sequence may refer to the sequence of the second pressure information that the reverse osmosis unit purifies the purified product water each time within the second target time period. The second pressure sequence may be determined based on the second pressure information stored in the storage unit for the reverse osmosis unit to purify the purified product water each time within the second target time period and its corresponding time.

In operation 1930, a water purification speed sequence may be obtained, the water purification speed sequence including the water purification speed of obtaining purified water each time within the second target time period.

The water purification speed sequence may refer to a sequence of a water purification speed for obtaining purified water each time within the second target time period. The water purification speed sequence may be determined based on the water purification speed stored in the storage unit for obtaining purified water each time within the second target time period and the corresponding time.

In operation 1940, the fourth lifespan of the reverse osmosis unit may be obtained, the fourth lifespan being the last determined lifespan of the reverse osmosis unit.

The fourth lifespan may be obtained by the last output from the second pressure determination model stored in the storage unit. When the last output of the second pressure determination model is not stored in the storage unit, the fourth lifespan may be determined by preset.

In operation 1950, the second lifespan may be determined through processing the second pressure sequence, the water purification speed sequence, and the fourth lifespan based on the second lifespan determination model.

A second lifespan determination model may be used to determine the remaining lifespan of the reverse osmosis unit. The second lifespan determination model may include, but is not limited to, a recurrent neural network model, a long short-term memory network model, or the like.

In some embodiments, the second lifespan of the reverse osmosis unit may be determined through processing the second pressure sequence, the water purification speed sequence, and the fourth lifespan by the second lifespan determination model. The inputs of the second lifespan determination model may include a second pressure sequence, a water purification speed sequence, and a fourth lifespan, and the output of the second lifespan determination model may be the second lifespan.

In some embodiments, the second lifespan determination model may be trained through a plurality of labeled training samples. The training samples may include the second pressure sequence, the water purification speed sequence within the time period corresponding to the fifth sample time point and the sixth sample time point, and the last determined remaining lifespan of the reverse osmosis unit within the foregoing time period. The label of the training sample may be the remaining lifespan of the reverse osmosis unit at the sixth sample time point. In the aforementioned time period, the reverse osmosis unit may be backwashed only at the fifth sample time point, and the fifth sample time point is earlier than the sixth sample time point. The aforementioned two remaining lifespans may be obtained by manually marking after detecting the reverse osmosis unit at the corresponding time point, and other data in the training sample may be obtained through the historical data in the storage unit. The plurality of labeled training samples may be input to the initial second lifespan determination model, and a loss function may be constructed according to the labels and the outputs of the initial second lifespan determination model. The parameters of the second lifespan determination model may be iteratively updated according to the loss function. When the loss function satisfies the preset conditions of the initial second lifespan determination model, the model training is completed, and the trained second lifespan determination model is obtained. The preset conditions may be that the loss function converges, the count of iterations reaches a threshold, or the like.

In some embodiments, the first lifespan determination model and the second lifespan determination model may share parameters. In some embodiments of the present disclosure, the parameters may be shared between the first lifespan determination model and the second lifespan determination model to reduce model training difficulty, reduce costs, and improve training efficiency.

In some embodiments, the first lifespan determination model and the second lifespan determination model may also be obtained through joint training with the pressure determination model. The training samples may include the first pressure sequence, the purification water production speed sequence within the corresponding time period from the seventh sample time point to the ninth sample time point, the remaining lifespan of the multi-stage filtration unit determined most recently within the foregoing time period, the second pressure sequence and the water purification speed sequence within the corresponding time period from the eighth sample time point to the ninth sample time point, the last determined remaining lifespan of the reverse osmosis unit within the aforementioned time period, as well as the water quality detection data and target water outlet speed at the ninth sample time point. The labels of the training samples may be the first pressure information and the second pressure information when the raw water is purified at the ninth sample time point. In the aforementioned two time periods, the multi-stage filtration unit was backwashed only at the seventh sample time point, and the reverse osmosis unit was backwashed only at the eighth sample time point, and the seventh sample time point and the eighth sample time point are both earlier than the ninth sample time point. The first pressure sequence, the purification water production speed sequence within the corresponding time period from the seventh sample time point to the ninth sample time point in the training sample, and the remaining lifespan of the multi-stage filtration unit determined most recently within the previous time period may be input into the initial first lifespan determination model. The output of the initial first lifespan determination model, the output of the initial second life determination model, the water quality detection data and the target water outlet speed of the ninth sample time point in the training sample may be input into the initial pressure determination model. A loss function may be constructed based on the outputs of the initial pressure determination model and label. The parameters including the initial first lifespan determination model, the initial second lifespan determination model, and the initial pressure determination model are iteratively updated according to the loss function. When the loss function satisfies the preset conditions, the training is completed, and the trained first lifespan determination model and the trained second lifespan determination model, and the trained pressure determination model are obtained. The preset conditions may include, but are not limited to, the loss function converges, the loss function value is less than the preset value, or the count of training iterations reaches the threshold.

In some embodiments, the first lifespan determination model and the second lifespan determination model may also be obtained by joint training with the backwashing model. The training samples may include the first pressure sequence, the purification water production speed sequence within the corresponding time period from the tenth sample time point to the thirteenth sample time point, and the remaining lifespan of the multi-stage filtration unit determined most recently within the aforementioned time period, the second pressure sequence, the water purification speed sequence within the corresponding time period from the tenth sample time point to the thirteenth sample time point, the remaining lifespan of the reverse osmosis unit determined most recently within the aforementioned time period, the historical target water outlet speed, historical purification water production speed, and historical water purification speed at the twelfth sample time point, and the target water outlet speed, the remaining lifespan of the multi-stage filtration unit, and the remaining lifespan of the reverse osmosis unit at the thirteenth sample time point. The labels of the training samples may be the backwashing parameters at the thirteenth sample time point. In the aforementioned two time periods, the multi-stage filtration unit was backwashed only at the tenth sample time point, and the reverse osmosis unit was backwashed only at the tenth sample time point, and the tenth sample time point and the tenth sample time point are both earlier than the thirteenth sample time point, and the twelfth sample time point is the time point of the last water purification treatment before the thirteenth sample time point. The first pressure sequence, the purification water production speed sequence within the corresponding time period from the tenth sample time point to the thirteenth sample time point, and the remaining lifespan of the multi-stage filtration unit determined most recently in the aforementioned time period in the training sample may be input into the initial first lifespan determination model. The second pressure sequence, the water purification speed sequence within the corresponding time period from the tenth sample time point to the thirteenth sample time point, the remaining lifespan of the reverse osmosis unit determined most recently in the aforementioned time period in the training sample lifespan may be input into the initial second lifespan determination model. The output of the initial first lifespan determination model, the output of the initial second lifespan determination model, and the historical target water outlet speed, historical purification water production speed, and historical water purification speed at the twelfth sample time point, the target water outlet speed, the remaining lifespan of the multi-stage filtration unit, and the remaining lifespan of the reverse osmosis unit at the thirteenth sample time point may be input into the initial backwashing model. A loss function may be constructed based on the output of the initial backwashing model and labels, and parameters including the initial first lifespan determination model, the initial second lifespan determination model, and the initial backwashing model are iteratively updated according to the loss function. When the loss function satisfies the preset condition, the training is completed, and the trained first lifespan determination model, the second lifespan determination model, and the backwashing model are obtained. The preset conditions may include, but are not limited to, the loss function converges, the loss function value is less than the preset value, or the count of training iterations reaches the threshold.

Through the first lifespan determination model and the second lifespan determination model described in some embodiments of the present disclosure, the remaining lifespans of the multi-stage filtration unit and the reverse osmosis unit may be determined respectively, so as to monitor the use of multi-stage filtration units and reverse osmosis units and ensure the efficiency and quality of purified water. At the same time, the first lifespan determination model and the second lifespan determination model may be jointly trained with other models to reduce the amount of training data, which is beneficial in some cases to solve the problem that it is difficult to obtain training samples when training the pressure determination model or the backwashing model alone.

It should be noted that the above description of each process is only for example and explanation, which does not limit the scope of application of this specification. For those skilled in the art, various modifications and changes can be made to various processes under the guidance of this specification. However, these amendments and changes are still within the scope of this specification.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A complete set of equipment for supplying drinking water in field, comprising:
 a multi-stage filtration unit, a reverse osmosis unit, and a power control unit connected by a plug-in pipeline, wherein the multi-stage filtration unit, the reverse osmosis unit, and the power control unit are units respectively carried by a single person and have frames with rectangular outer contours;

the multi-stage filtration unit including a first raw water inlet, a first pre-filter, a pressure pump, a ceramic membrane separator, a multi-media filter, an ultraviolet sterilizer, and a first purified water outlet connected by a pipe, wherein the first pre-filter, the pressure pump, the ceramic membrane separator, the multi-media filter, and the ultraviolet sterilizer are fixed in the frame;

the multi-stage filtration unit further including a first relief switch, a second relief switch, and a third relief switch, wherein a water inlet of the first relief switch is connected with a water outlet cavity of the first pre-filter, a water inlet of the second relief switch is connected with a water outlet cavity of the ceramic membrane separator, a water inlet of the third relief switch is connected with a water outlet cavity of the multi-media filter, and water outlets of the first relief switch, the second relief switch, and the third relief switch are connected with a first relief port of the multi-stage filtration unit;

the multi-stage filtration unit further including a reclaimed water outlet and a water purification mode switching valve, wherein the water purification mode switching valve has two states of connecting the water outlet cavity of the ceramic membrane separator with the reclaimed water outlet and connecting the water outlet cavity of the multi-media filter and the water inlet cavity of the ultraviolet sterilizer; and the reverse osmosis unit including a second raw water inlet, a second pre-filter, a high-pressure pump, a reverse osmosis membrane filter, and a second purified water outlet connected by the pipe, wherein the second pre-filter, the high-pressure pump, and the reverse osmosis membrane filter are fixed in the frame, the reverse osmosis unit has a first relief valve, a second relief valve, and a shut-off regulating valve, a water inlet of the first relief valve is connected with a water outlet cavity pipe of the second pre-filter, a water inlet of the second relief valve is connected with a water outlet pipe of the reverse osmosis membrane filter, a water inlet of the shut-off regulating valve is connected with a water inlet cavity pipeline of the reverse osmosis membrane filter, and the first relief valve, water outlets of the second relief valve, and the shut-off regulating valve are connected with a second relief port of the reverse osmosis unit.

2. The complete set of equipment for supplying drinking water in field according to claim 1, comprising:
the frame of the power control unit having panels on six sides, and the panels being provided with 220V Alternating Current (AC), 24V Direct Current (DC), and 12V DC power inlet;
the panels also being provided with a power outlet for supplying 24V DC to the reverse osmosis unit and the multi-stage filtration unit of water treatment respectively and an auxiliary power outlet for supplying 24V DC to heating jackets of the reverse osmosis unit and the multi-stage filtration unit respectively;
the panels also being provided with separate power output buttons for connecting power buttons, working power of the reverse osmosis unit and the multi-stage filtration unit, and power of the heating jacket; and
a power adapter in the frame including a switching power supply for converting 220V AC to 24V DC and a power converter for converting 12V DC to 24V DC, and the switching power supply including a leakage circuit breaker, and the power converter including a DC circuit breaker.

3. The complete set of equipment for supplying drinking water in field according to claim 2, wherein the frame of the power control unit is further provided with a high-pressure pump driver for adjusting rotational speed of the high-pressure pump of the reverse osmosis unit, the high-pressure pump driver is located between the 24V DC power supply and a power supply interface of the reverse osmosis unit, and the panel is provided with a signal interface for receiving an adjustment signal of the reverse osmosis unit.

4. The complete set of equipment for supplying drinking water in field according to claim 2, wherein the frames of the multi-stage filtration unit, the reverse osmosis unit, and the power control unit are respectively provided with buckle ears for carrying each unit.

5. The complete set of equipment for supplying drinking water in field according to claim 1, wherein the ceramic membrane separator of the multi-stage filtration unit is a cross-flow membrane separator, and a water outlet of a cross-flow valve connected with the water inlet cavity of the ceramic membrane separator is connected with the first relief port.

6. The complete set of equipment for supplying drinking water in field according to claim 5, further including:
a pressure gauge on the pipe between the cross-flow valve and the water inlet cavity of the ceramic membrane separator, wherein the pressure gauge is located on an operation panel; and
a flow meter on the pipe between the water outlet cavity of the multi-media filter and the purified water outlet, wherein the flow meter is located on the operation panel.

7. The complete set of equipment for supplying drinking water in field according to claim 1, wherein the multi-stage filtration unit has a first air supply switch and a second air supply switch, and the first air supply switch is connected with a water inlet cavity pipe of the ceramic membrane separator, and the second air supply switch is connected with a water outlet cavity pipe of the ceramic membrane separator.

8. The complete set of equipment for supplying drinking water in field according to claim 1, wherein the pressure pump of the multi-stage filtration unit includes an electric booster pump and a manual booster pump which are connected in parallel on the pipe, and two parallel nodes are respectively provided with a three-way directional valve.

9. The complete set of equipment for supplying drinking water in field according to claim 1, further including a water storage unit, wherein the water storage unit is a box that doubles as the multi-stage filtration unit, the reverse osmosis unit, and the power control unit for storing and transporting packaging boxes.

10. The complete set of equipment for supplying drinking water in field according to claim 9, wherein the water storage unit includes a water volume sensing device, and the water volume sensing device is configured to:
detect a water volume of purified water in the water storage unit; and
issue a water shortage reminder when the water volume is lower than a water volume threshold.

11. The complete set of equipment for supplying drinking water in field according to claim 1, further including a water quality detection unit and a processing unit, wherein the water quality detection unit is configured to:
determine a water quality detection data of raw water through detecting the raw water;
the processing unit is configured to:

determine a first pressure information of the pressure pump in the multi-stage filtration unit and a second pressure information of the high-pressure pump in the reverse osmosis unit based on the water quality detection data;

obtain purified product water through controlling the multi-stage filtration unit to purify the raw water based on the first pressure information; and obtain the purified water through controlling the reverse osmosis unit to purify the purified product water based on the second pressure information.

12. The complete set of equipment for supplying drinking water in field according to claim 11, wherein the processing unit is further configured to:

obtain a target water outlet speed of the purified water;

obtain a first lifespan of the multi-stage filtration unit at current and a second lifespan of the reverse osmosis unit at current; and determine the first pressure information and the second pressure information based on a pressure determination model processing the water quality detection data, the target water outlet speed, the first lifespan, and the second lifespan.

13. The complete set of equipment for supplying drinking water in field according to claim 11, further including a backwashing unit, wherein the processing unit is further configured to:

obtain a historical target water purification speed of last water purification treatment of the complete set of the equipment, a historical purification water production speed of an actual production purified product water, and a historical water purification speed of an actual production water purification;

determine whether backwashing needs to be performed on at least one of the multi-stage filtration unit or the reverse osmosis unit based on the historical target water purification speed, the historical purification water production speed, and the historical water purification speed;

in response to a determination that the backwashing needs to be performed on at least one of the multi-stage filtration unit or the reverse osmosis unit, determine backwashing parameters for backwashing at least one of the multi-stage filtration unit or the reverse osmosis unit based on the historical target water purification speed, the historical purification water production speed, and the historical water purification speed;

send the backwashing parameters to the backwashing unit;

wherein the backwashing unit is configured to:

backwash at least one of the multi-stage filtration unit or the reverse osmosis unit based on the backwashing parameters.

14. The complete set of equipment for supplying drinking water in field according to claim 13, wherein the processing unit is further configured to:

obtain the target water outlet speed of the purified water;

obtain a first lifespan of the multi-stage filtration unit at current and a second lifespan of the reverse osmosis unit at current; and determine the backwashing parameters based on a backwashing model processing the historical target water purification speed, the historical purification water production speed, the historical water purification speed, the first lifespan, and the second lifespan.

15. The complete set of equipment for supplying drinking water in field according to claim 1, including a water delivery unit for extracting raw water from outside.

* * * * *